(12) United States Patent
Fukuyama

(10) Patent No.: US 8,144,233 B2
(45) Date of Patent: Mar. 27, 2012

(54) DISPLAY CONTROL DEVICE, DISPLAY CONTROL METHOD, AND DISPLAY CONTROL PROGRAM FOR SUPERIMPOSING IMAGES TO CREATE A COMPOSITE IMAGE

(75) Inventor: Takashi Fukuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 12/235,093

(22) Filed: Sep. 22, 2008

(65) Prior Publication Data

US 2009/0091635 A1     Apr. 9, 2009

(30) Foreign Application Priority Data

Oct. 3, 2007   (JP) .................................. 2007-260113
Aug. 7, 2008   (JP) .................................. 2008-204567

(51) Int. Cl.
  *H04N 5/222*   (2006.01)
(52) U.S. Cl. .............. 348/333.05; 348/220.1; 348/222.1
(58) Field of Classification Search ............... 348/220.1, 348/231.3, 333.05
See application file for complete search history.

(56) References Cited

U.S. PATENT DOCUMENTS

| | | | |
|---|---|---|---|
| 6,871,010 B1 * | 3/2005 | Taguchi et al. ............ | 348/220.1 |
| 7,257,317 B2 * | 8/2007 | Ohnishi ..................... | 348/220.1 |
| 7,729,608 B2 * | 6/2010 | Okubo ........................ | 348/220.1 |
| 2008/0174669 A1 * | 7/2008 | Okada et al. ............... | 348/220.1 |
| 2009/0244320 A1 * | 10/2009 | Ito .............................. | 348/231.2 |

* cited by examiner

*Primary Examiner* — Gevell Selby
(74) *Attorney, Agent, or Firm* — Oblon, Spivak, McClelland, Maier & Neustadt, L.L.P.

(57) ABSTRACT

A display control device includes: a composite image generating unit configured to generate a composite image by compositing a unit image and a still image, such that a still image which is correlated with a moving image and has a still image aspect ratio different from a moving image aspect ratio, is superimposed on a portion of a unit image of the moving image which is formed of multiple temporally continuous unit images having a moving image aspect ratio; and a display control unit configured to display the composite image on a display screen of a display unit.

8 Claims, 15 Drawing Sheets

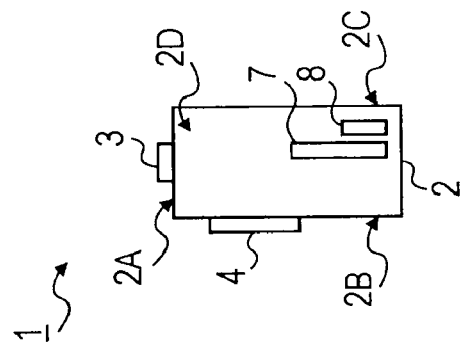
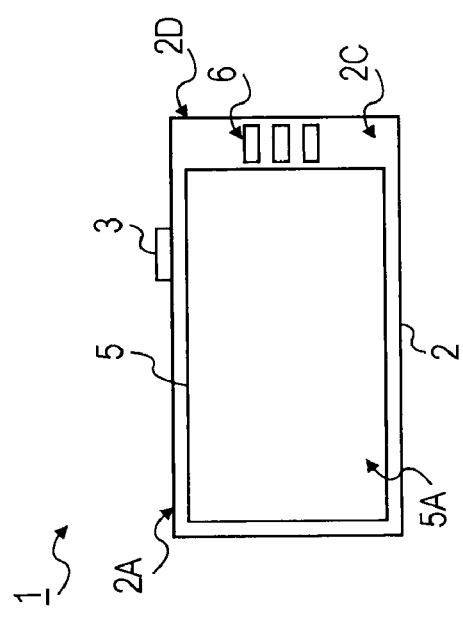
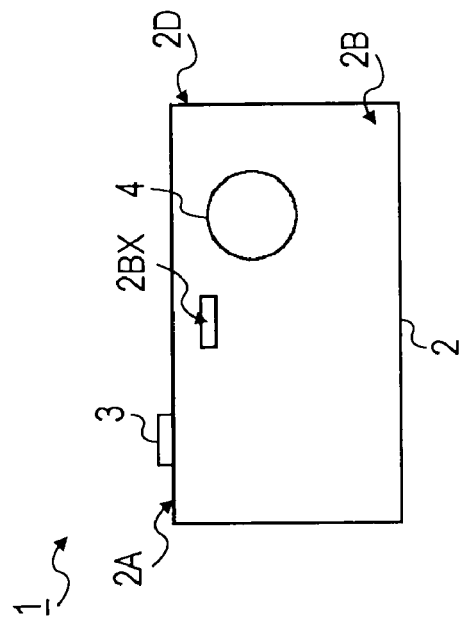

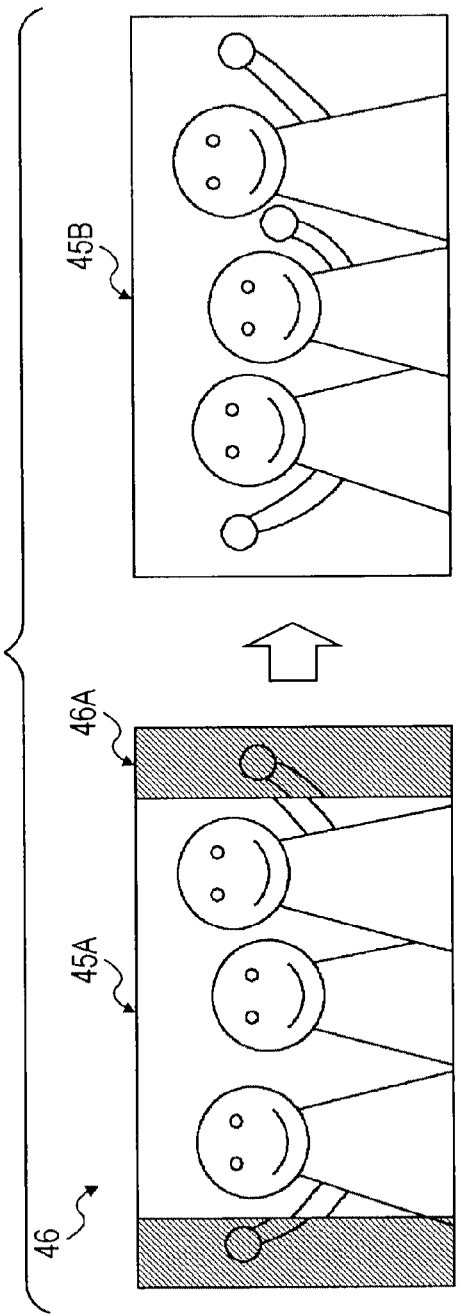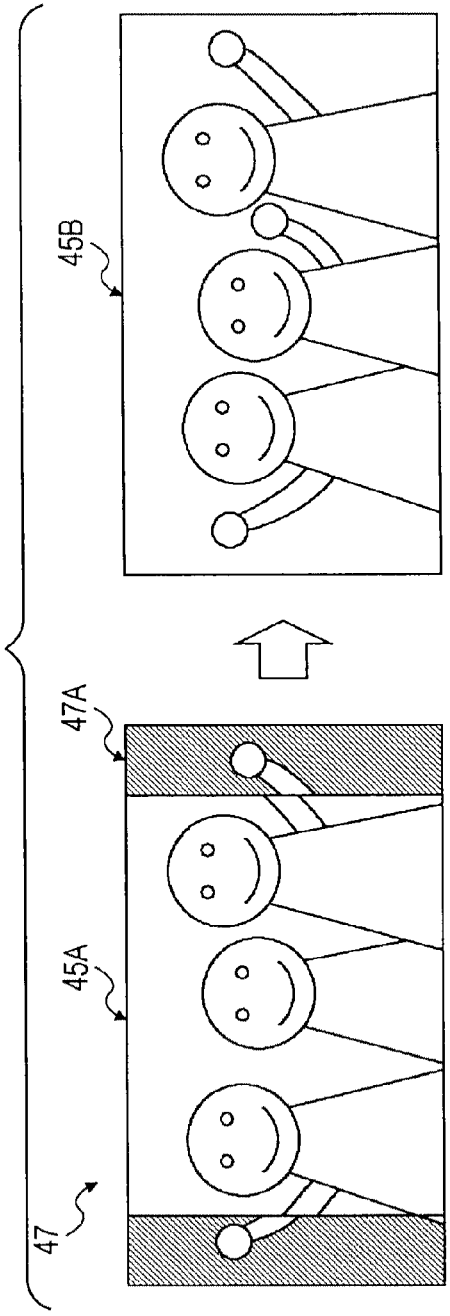

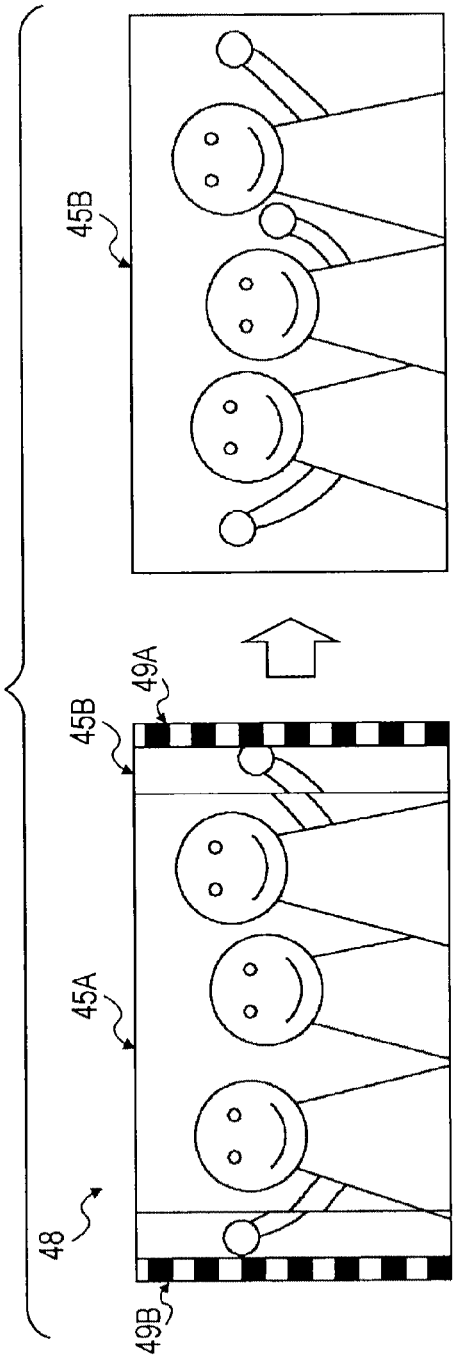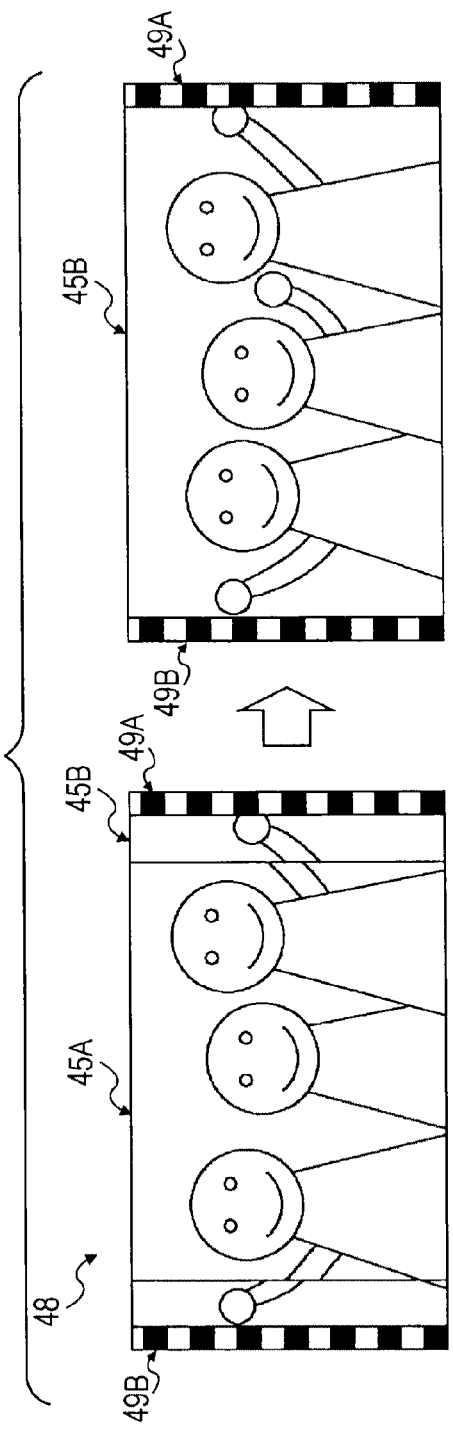

| LINK0000. DAT | |
|---|---|
| ORDER | FILE NAME |
| 1 | IMG0001. JPG |
| 1 | MOV0001. MPG |
| 1 | IMG0002. JPG |
| 1 | MOV0002. MPG |
| ⋮ | ⋮ |
| (N-1) | IMG0101. JPG |
| 1 | MOV0101. MPG |

DISPLAY CONTROL DEVICE, DISPLAY CONTROL METHOD, AND DISPLAY CONTROL PROGRAM FOR SUPERIMPOSING IMAGES TO CREATE A COMPOSITE IMAGE

CROSS REFERENCES TO RELATED APPLICATIONS

The present invention contains subject matter related to Japanese Patent Application JP 2007-260113 filed in the Japanese Patent Office on Oct. 3, 2007 and Japanese Patent Application JP 2008-204567 filed in the Japanese Patent Office on Aug. 7, 2008, the entire contents of which are incorporated herein by reference.

BACKGROUND OF THE INVENTION

1. Field of the Invention

The present invention relates to a display control device, a display control method, and a display control program, which can be suitably applied to a digital still camera which can photograph a subject as a still image (hereinafter, photographing a subject as a still image may also be referred to as "still image shooting") and also which can shoot a subject as a moving image (hereinafter shooting a subject as a moving image may also be referred to as "moving image shooting").

2. Description of the Related Art

With the related art, when a digital still camera performs still image shooting of a subject, a still image obtained as the result of the photography is generated and recorded. Also, when a digital still camera performs still image shooting of a subject, a still image obtained as the result of thinning out the pixels of the still image and reducing the size (hereinafter also referred to as "still image thumbnail") is generated and recorded.

Also, with the related art, when a digital still camera performs moving image shooting of a subject, a moving image, formed of a plurality of unit images (field images or frame images) which are temporally continuous, obtained as the result of the shooting, is generated and recorded. Also, when a digital still camera performs still image shooting of a subject, a unit image representing the moving image is extracted from the moving image, and a still image obtained as the result of thinning out the pixels of the unit image and reducing the size (hereinafter also referred to as "unit image thumbnail") is generated and recorded.

With the related art, a digital still camera displays a list of multiple still image thumbnails and multiple unit image thumbnails on a display screen of a display unit, arranged in matrix fashion. Thus, the digital still camera enables a user to search for still images and moving images to be played by the still image thumbnails and unit image thumbnails displayed on the display screen of the display unit (e.g., Japanese unexamined Patent Application Publication No. 2006-295236 (pp 8 and 11, FIG. 10)

SUMMARY OF THE INVENTION

Now, some digital still cameras according to the related art perform operations of, in addition to taking still images and moving images of a subject separately, taking a still image and a moving image in time-division in accordance with a single shutter operation. More specifically, following taking a still image, a moving image is automatically shot. However, even with digital still cameras of such a configuration, a list of multiple still image thumbnails and multiple unit image thumbnails are still displayed on a display screen of a display unit, arranged in matrix fashion, in the same way as with the above-described digital still camera according to the related art.

That is to say, with the digital still camera of such a configuration, there has been no consideration of differentiation in display of still image thumbnails and unit image thumbnails of related still images and moving images generated by still image shooting and moving image shooting in time division, and other still image thumbnails and unit image thumbnails.

There has been realized the need to provide a display control device, display control method, and display control program enabling correlated still images and moving images to be easily differentiated.

A display control device according to an embodiment of the present invention includes: a composite image generating unit configured to generate a composite image by compositing a unit image and a still image, such that a still image which is correlated with a moving image and has a still image aspect ratio different from a moving image aspect ratio, is superimposed on a portion of a unit image of the moving image which is formed of multiple temporally continuous unit images having a moving image aspect ratio; and a display control unit configured to display the composite image on a display screen of a display unit.

With this configuration, still images and unit images of a moving image of correlated still images and moving images serving as a composite image can be displayed so as to be distinguished from other still images and unit images of moving images.

With the above configuration, a display control device, display control method, and display control program can be realized wherein a composite image is generated by compositing a unit image and a still image, such that a still image which is correlated with a moving image and has a still image aspect ratio different from a moving image aspect ratio, is superimposed on a portion of a unit image of the moving image which is formed of multiple temporally continuous unit images having a moving image aspect ratio, and the composite image is displayed on a display screen of a display unit, whereby still images and unit images of a moving image of correlated still images and moving images serving as a composite image can be displayed so as to be distinguished from other still images and unit images of moving images, and accordingly correlated still images and moving images can be easily distinguished.

BRIEF DESCRIPTION OF THE DRAWINGS

FIGS. 1A through 1C are outline drawings illustrating external views of a digital still camera according to the present invention;

FIG. 13 is an outline drawing for description of switching (2) from display of a main composite image to a main moving image;

FIG. 14 is an outline drawing for description of switching (3) from display of a main composite image to a main moving image;

FIG. 15 is an outline drawing for description of switching (4) from display of a main composite image to a main moving image;

FIG. 16 is an outline drawing for description of switching (5) from display of a main composite image to a main moving image;

FIG. 25 is an outline drawing illustrating the configuration of a playlist.

DESCRIPTION OF THE PREFERRED EMBODIMENTS

Figure 2:
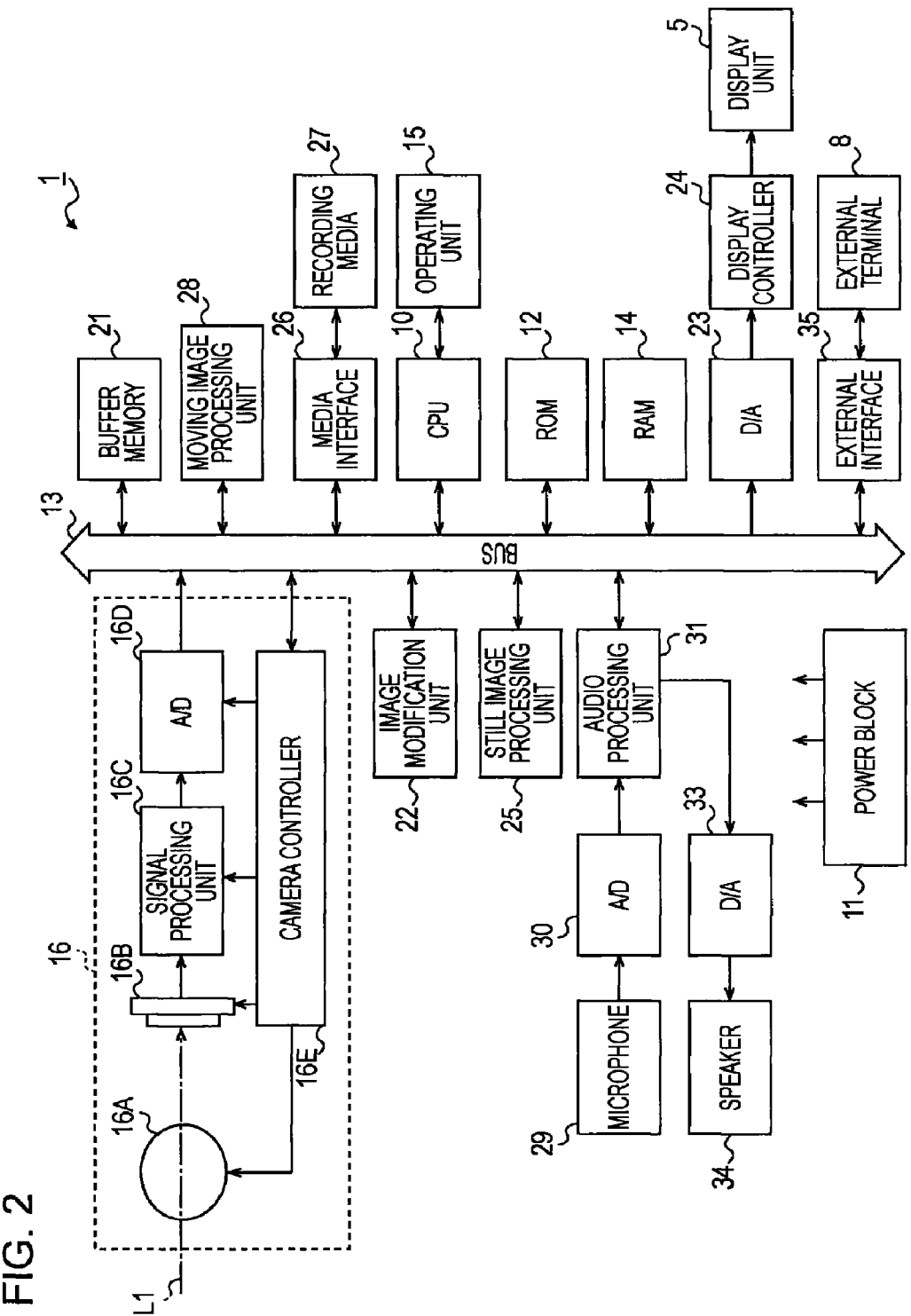
FIG. 2 is a block diagram illustrating one arrangement of a circuit configuration of a digital still camera according to an embodiment of the present invention.

Embodiments of the present invention will be described in detail with reference to the drawings.
First Embodiment
1. Configuration
1-1. External Configuration of Digital Still Camera In FIGS. 1A through 1C, reference numeral 1 denotes a digital still cameral to which the present invention has been applied, the overall external view shown here. The digital still camera 1 has a main unit 2 formed of a box-shaped casing.

An upper face 2A of the main unit 2 is provided with a shutter button 3, and a photography lens 4 is positioned at a front face 2B of the main unit 2. Thus, the main unit 2 is configured so as to enable the photography lens 4 to be pointed toward a subject along with the front face 2B, and in the event that thus shutter button 3 is pressed in this state, still image shooting and moving image shooting of the subject can be performed.

Further, a hole 2BX is bored in the front face 2B of the main unit 2, so as to collect external sound by a microphone stored within the main unit 2, via the hole 2BX. This enables collecting of external sound by the internal microphone via the hole 2BX, at the time of moving image shooting of the subject.

Further, on a back face 2C of the main unit 2, a display unit 5 configured of a liquid crystal display or organic EL (Electro Luminescence) display or the like is disposed with a square display screen 5A exposed. The display unit 5 is formed such that the display screen 5A has an aspect ratio (also called "screen aspect ratio") of 16:9, for example. It should be noted that the screen aspect ratio of the display screen 5A is the ratio between the length of the display screen 5A in the sideways direction of the screen (i.e., the horizontal direction), and the length in the up and down direction (i.e., the vertical direction).

Further, on a back face 2C of the main unit 2, various operating buttons 6 are provided for inputting various commands, to perform various settings and displays and so forth. Accordingly, still images can be displayed on the display screen 5A of the display unit 5 in accordance with operation of the operating buttons 6 by the user, based on still image data generated by still image shooting of a subject. Further, moving images can be displayed on the display screen 5A of the display unit 5 in accordance with the operation of operating buttons 6 by the user, based on moving image data generated by still image shooting of a subject.

Additionally, a side face 2D of the main unit 2 is provided with a media slot 7 where a small oblate rectangular recording medium in which semiconductor memory is built in, is mounted. Thus, still image data generated by still image shooting of a subject, and moving image data generated by moving image shooting of a subject, can be recorded in the recording media.

Also provided to the side face 2D of the main unit 2 is an external terminal 8 for connection with an external device (not shown in the drawings) such as an external television receiver or personal computer or like. Thus, in the event of being connected to an external device via the external terminal 8, still images obtained by playing still image data generated by still image shooting of a subject, and moving images obtained by playing moving image data generated by moving image shooting of a subject, can be output to the external device in accordance with user operations of the operating buttons 6. Thus, still images based on still image data and moving images based on moving image data can be displayed on an external device, as well.

1-2. Circuit Configuration of Digital Still Camera

Next, the circuit configuration of the digital still camera 1 will be described with reference to FIG. 2. The digital still camera 1 has, along with a CPU (Central Processing Unit) 10, various types of circuit blocks, such as a power block 11 which has a battery.

The CPU 10 operates on power supplied from the power block 11, and also causes the power block 11 to supply electric power to each of the circuit blocks, so the circuit blocks operate appropriately. Also, the CPU 10 reads out programs stored in ROM (Read Only Memory) 12, such as a display control program, to RAM (Random Access Memory) 14 via a bus 13. The CPU 10 the controls the entire digital still camera 1 following the various programs loaded to the RAM 14, and executes various types of commands input from an operating unit 15 made up of the shutter button 3 and operating buttons 6, in accordance with user operations. Thus, the CPU 10 controls a camera block 16 by sending control signals to the camera block 16 when in a still image shooting mode.

Note that the camera block 16 has the aforementioned photography lens 4 and a camera lens unit 16A wherein optical elements such as a diaphragm for adjusting exposure are disposed in order on the optical axis. The camera block 16 also has an imaging device 16B such as a CCD (Charge Coupled Device) image sensor or CMOS (Complementary Metal Oxide Semiconductor) image sensor, disposed behind the camera lens unit 16A.

The imaging device 16B is formed with a square photoreception face having an aspect ratio of 4:3 for example (hereinafter, this may be referred to as "photoreception face aspect ratio"). Note that the photoreception face aspect ratio of the photoreception face is the ratio of the horizontal and vertical directions of the photoreception face.

The camera block 16 is also provided with a signal processing unit 16C, A/D converter 16D, and camera controller 16E. The camera controller 16E performs driving control of the camera lens unit 16A in accordance with control signals provided from the CPU 10 so as to adjust focus, exposure, etc., of the subject. The camera controller 16E also controls the imaging unit 16B, signal processing unit 16C, and A/D converter 16D, in accordance with control signals provided from the CPU 10.

Thus, the imaging device 16B receives imaging light L1 from the subject which has passed through the camera lens 16A, at the photoreception face. Thus, the imaging device 16B sequentially performs photoelectric conversion of the imaging light L1 received at the photoreception face and generates analog photoelectric conversion signals in accordance with the imaging light L1, and sequentially outputs the generated photoelectric conversion signals to the signal processing unit 16C.

Each time the signal processing unit 16C receives image signals sequentially generated in this manner, the signal processing unit 16C performs A/D conversion processing with the A/D converter 16D, and outputs this as digital image data to buffer memory 21 so as to be temporarily stored.

Now, the image data generated by the camera block 16 has the same number of pixels as the number of pixels of the photoreception face of the imaging device 16B (hereafter, may be referred to as "valid pixels") and also has the same aspect ratio as the photoreception face aspect ratio.

At this time, an image modification unit 22 sequentially reads out the temporarily recorded image data form the buffer memory 21, and subjects the image data that has been read out to trimming processing (or cropping processing) according to the screen aspect ratio. The image modification unit 22 also performs image reduction processing wherein the pixels are thinned out in accordance with the resolution of the display screen 5A (i.e., the number of pixels per unit length of the display screen 5A). Accordingly, the image modification unit 22 generates image data of an imaged image made up of multiple unit images which have an aspect ratio of 16:9 for example, and are temporally continuous.

It should be noted that the aspect ratio of 16:9 for the unit image is the ratio between the length of the unit image in the horizontal direction in the image (hereinafter also referred to as "image sideways direction"), and the length in the vertical direction of the image (hereinafter also referred to as "image up and down direction").

The image modification unit 22 generates imaged image data in this way, and concurrently sends the imaged image data to the CPU 10. At this time, the CPU 10 performs D/A conversion processing of the imaged image data provided by the image modification unit 22 with the D/A converter 23, and outputs to a display controller 24 as analog imaged image signals.

The display controller 24 sends the imaged image signals provided from the CPU 10 to the display unit 5, so that the imaged image is displayed on the display screen 5A of the display unit 5 based on the imaged image signals. Thus, the CPU 10 enables the user to confirm the imaging state of the subject by way of the imaged image displayed on the display screen 5A of the display unit 5.

In the event that the user has pressed the shutter button 3 in this state such that a still image shooting command is input from the operating unit 15 to the CPU 10, the one set of image data that has been generated at the camera block 16 and temporarily stored at the buffer memory 21 at the point of input is taken as image data for still image shooting.

The image modification unit 22 then reads out the image data for still image shooting from the buffer memory 21, and subjects this image data for still image shooting that has been read out to trimming processing (or cropping processing) in accordance with the aspect ratio of 4:3 predetermined for still image shooting.

Also, the image modification unit 22 subjects the image data for still image shooting to image reduction processing wherein pixels are thinned out in accordance with the predetermined recording image size for the still image that has been determined beforehand (hereinafter, also referred to as "still image size"). Note that the still image size is expressed in terms of the number of pixels in the image horizontal direction and the number of pixels in the image vertical direction of the still image. Thus, the image modification unit 22 generates still image data for a still image to be recorded, having an aspect ratio of 4:3, based on the image data for still image shooting. Note that hereinafter, still image data of a still image for recording, that has been generated based on image data for still image shooting, will be referred to as "main still image data", and a still image based on this still image data will be referred to as a "main still image".

Also, in the following description, the 4:3 aspect ratio predetermined for still images will also be referred to as "still image aspect ratio". Note that the still image aspect ratio is the ratio between the length in the horizontal direction of the still image (hereinafter also referred to as "still image sideways length"), and the length in the vertical direction of the image (hereinafter also referred to as "still image up and down length").

Figure 3:
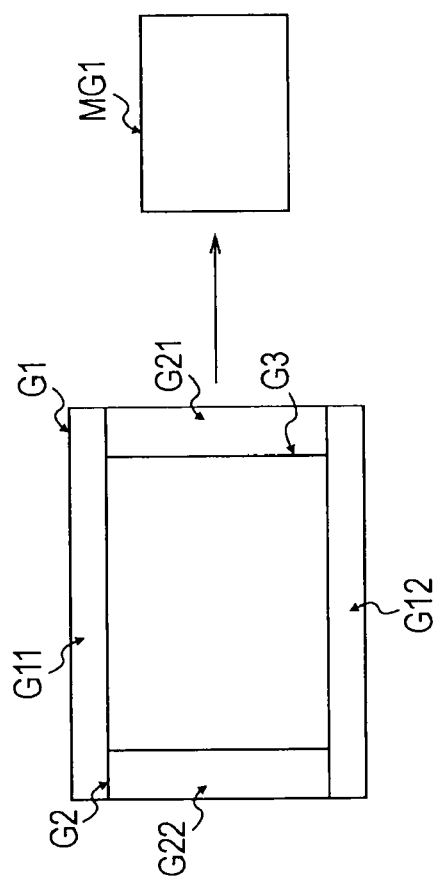
FIG. 3 is an outline drawing for description of generating of main still image data.

As shown in FIG. 3, as a specific example, the image modification unit 22 reads out the image data of an image G1 from the buffer memory 21 having an aspect ratio of 4:3, as image data for still image shooting. The image modification unit 22 erases a band-shaped portion G11 of the image G1 from the top in the image vertical direction, extending from the right side to the left side in the image horizontal direction (hereinafter, also referred to as upper band-shaped portion"), and further erases a band-shaped portion G12 of the image G1 from the bottom in the image vertical direction, extending from the right side to the left side in the image horizontal direction (hereinafter, also referred to as lower band-shaped portion").

Thus, the image modification unit 22 generates an image G2 having an aspect ratio of 16:9 from the image G1 having an aspect ratio of 4:3, based on the image data for still image shooting. Further, the image modification unit 22 erases a band-shaped portion G21 of the image G2 from the right in the image horizontal direction, extending from the top to the bottom in the image vertical direction (hereinafter, also referred to as right band-shaped portion"), and moreover erases a band-shaped portion G22 of the image G2 from the left in the image horizontal direction, extending from the top to the bottom in the image vertical direction (hereinafter, also referred to as left band-shaped portion").

Thus, the image modification unit 22 generates a still image G3 from the image G2 having an aspect ratio of 16:9. The image modification unit 22 then thins out the pixels of the still image G3 without changing the still image aspect ratio, in accordance with the still image size (i.e., performs image reduction processing), thereby generating main still image data for a main still image MG1.

The image modification unit 22, upon having generated the main still image data in this way, sends the generated main still image data to the buffer memory 21 for temporary recording. At this time, a still image processing unit 25 reads the temporarily recorded main still image data from the buffer memory 21.

The still image processing unit 25 performs compression encoding of the main still image data with a still image compression encoding method to generate compressed still image data, and sends the generated compressed still image data to the buffer memory 21 for temporary recording.

Also, the CPU 10 reads out the compressed still image data from the buffer memory 21, and sends the compressed still image data that has been read out to recording media 27 via the media interface 26. Thus, the CPU 10 records the compressed still image data in the recording media 27, and in this way the user can perform still image shooting of a subject.

Also, the CPU 10 is arranged such that, in a moving image shooting mode, an imaged image based on imaged image signals is displayed on the display screen 5A of the display unit 5 in the same way as with the above-described still image shooting mode, so that the user can confirm the imaged state of the subject.

In the event that the user has pressed the shutter button 3 in this state such that a moving image shooting command is input from the operating unit 15 to the CPU 10, a period from the point of input till a predetermined amount of time elapses, or a period from the point of input till the user presses the shutter button 3 such that a moving image shooting end command is input from the operating unit 15, is taken as a moving image shooting period.

The CPU 10 takes multiple sets of image data sequentially generated at the camera block 16 during the moving image shooting period and temporarily recorded in the buffer memory 21, as image data for moving image shooting. At this time, the image modification unit 22 reads out the multiple sets of image data for moving image shooting from the buffer memory 21, and subjects this image data for moving image shooting that has been read out to trimming processing (or cropping processing) in accordance with the aspect ratio of 16:9 predetermined for moving image shooting.

Also, the image modification unit 22 subjects the multiple sets of image data for moving image shooting to image reduction processing wherein pixels are thinned out in accordance with the predetermined recording image size for the moving image that has been determined beforehand (hereinafter, also referred to as "moving image size"). Note that the moving image size is expressed in terms of the number of pixels in the image horizontal direction and the number of pixels in the image vertical direction of the unit images making up the moving image (i.e., field images or frame images). Thus, the image modification unit 22 generates moving image data for a moving image to be recorded by multiple temporally continuous unit images, having an aspect ratio of 16:9, based on the image data for moving image shooting.

Note that hereinafter, moving image data of a moving image for recording, that has been generated based on multiple sets of image data for moving image shooting, will be referred to as "main moving image data", and a moving image based on this moving image data will be referred to as a "main moving image". Also, hereinafter, the multiple unit images making up a main moving image may also each be referred to as "main unit image", and unit image data of the main unit images may be referred to as "main unit image data".

Also, in the following description, the 16:9 aspect ratio predetermined for moving images may also be referred to as "moving image aspect ratio". Note that the moving image aspect ratio is the ratio between the length in the horizontal direction of the unit images making up the moving image (hereinafter also referred to as "still image sideways length"), and the length in the vertical direction of the image (hereinafter also referred to as "still image up and down length").

Figure 4:
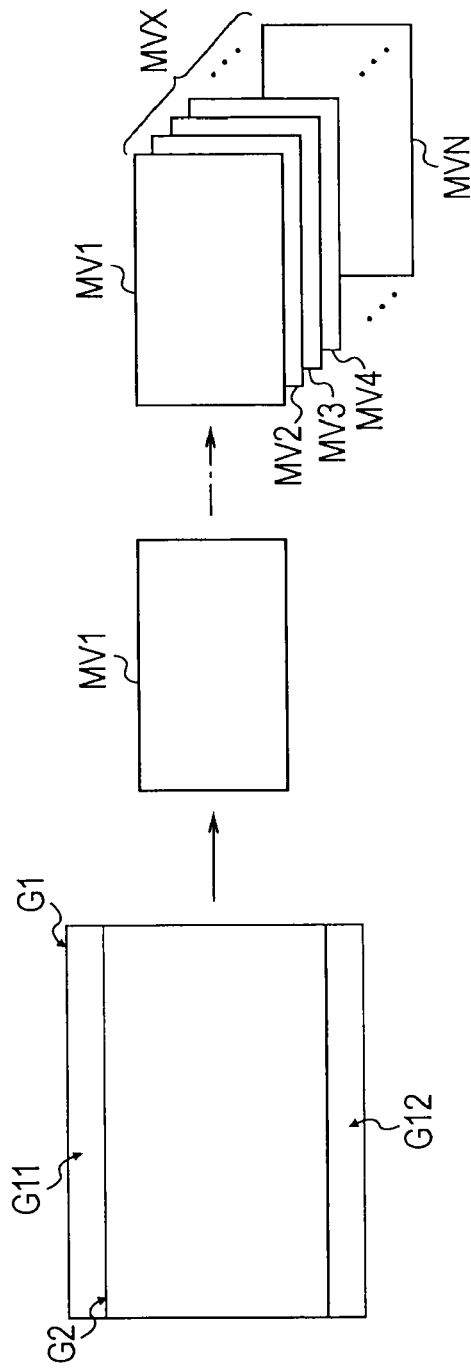
FIG. 4 is an outline drawing for description of generating of main moving image data.

As shown in FIG. 4, as a specific example, the image modification unit 22 reads out the image data of multiple temporally continuous images G1 from the buffer memory 21 having an aspect ratio of 4:3 (i.e., the photoreception face aspect ratio), as image data for moving image shooting. The image modification unit 22 erases an upper band-shaped portion G11 and lower band-shaped portion G12 from the top and bottom of the multiple images G1. Thus, the image modification unit 22 generates multiple unit images G2 having a moving image aspect ratio from the image G1 having an aspect ratio of 4:3.

Then, the image modification unit 22 generates multiple main unit images MV1 through MVN from the multiple unit images G2 by thinning out the pixels of each of the multiple unit images G2 without changing the moving image aspect ratio, in accordance with the moving image size (i.e., performs image reduction processing).

The image modification unit 22, upon having generated the main moving image data in this way, sends the generated main still image data to the buffer memory 21 for temporary recording. At this time, a moving image processing unit 28 reads the temporarily recorded main still image data from the buffer memory 21, performs compression encoding of the main moving image data with a moving image compression encoding method to generate compressed moving image data, and sends the generated compressed moving image data to the buffer memory 21 for temporary recording.

Also, the CPU 10 collects ambient sound with the microphone 29 during the moving image shooting period and generates analog audio signals, and also performs A/D conversion of the audio signals with an A/D converter 30, so as to send out to an audio processing unit 31 as audio data. The audio processing unit 31 performs compression encoding of the audio data provided from the microphone 29 via the A/D converter 30 with a audio compression encoding method to generate compressed audio data, and sends the generated compressed audio data to the buffer memory 21 for temporary recording.

The CPU 10 performs reads out the temporarily recorded compressed moving image data and compressed audio from the buffer memory 21 where they have been stored, and performs time-division multiplexing, thereby generating a moving image stream. The CPU 10 also sends the moving image stream to the recording media 27 via the media interface 26, thereby recording the moving image stream in the recording media 27. Thus, the CPU 10 enables the user to perform moving image shooting of a subject.

Note that the CPU 10 is not restricted to still image shooting of the subject alone or moving image shooting of the subject alone, and still image shooting and moving image shooting can be performed in time-division in accordance with a single shutter operation of the shutter button 3.

In a time division shooting mode wherein still image shooting and moving image shooting of a subject is performed in time-division, an imaged image based on imaged image signals is displayed on the display screen 5A of the display unit 5 in the same way as with the above-described still image shooting mode, so that the user can confirm the imaged state of the subject.

In the event that the user has pressed the shutter button 3 in this state such that a time division image shooting command is input from the operating unit 15 to the CPU 10, still image shooting of the subject at the point of input is executed, immediately following which moving image shooting is also automatically executed.

In this case, the CPU 10 takes the one set of image data that has been generated at the camera block 16 and temporarily stored at the buffer memory 21 at the point of input of the time division shooting command is taken as image data for time division shooting. Thus, the CPU 10 generates compressed still image data based on the image data for still image shooting, and records this in the recording media 27, in the same way as with the above-described still image shooting mode.

Also, following generating of image data for still image shooting being at the camera block 16, upon the next image data being generated, a period from the point of this next image data being generated till a predetermined amount of time elapses, or a period from the point of this next image data being generated till the user presses the shutter button 3 such that a time division image shooting end command is input from the operating unit 15, is taken as a moving image shooting period.

The CPU 10 takes multiple sets of image data sequentially generated at the camera block 16 during the moving image shooting period and temporarily recorded in the buffer memory 21, as image data for moving image shooting. Note that the multiple sets of image data for moving image shooting are the multiple sets of image data from the image data generated following the image data for sill image shooting by the camera block 16 up to the image data generated at the ending point of the moving image shooting period.

Thus, the CPU 10 generates a moving image stream based on multiple sets of image data for moving image shooting and records this in the recording media 27, in the same way as with the above-described moving image shooting mode. Accordingly, the CPU 10 can realize time-division still image shooting and moving image shooting of the subject.

Now, upon performing still image shooting of the subject and generating compressed still image data, the CPU 10 records the compressed image data in the recording media 27 as a file. Also, upon performing moving image shooting of the subject and generating a moving image stream, the CPU 10 records the moving image file in the recording media 27 as a file. Further, the CPU 10 assigns unique file names to the compressed still image data made into a file (hereinafter also referred to as "still image file") and the moving image stream made into a file (hereinafter also referred to as "moving image file"). Thus, the CPU 10 enables the still image files and moving image files to be managed by file names.

Figure 5:
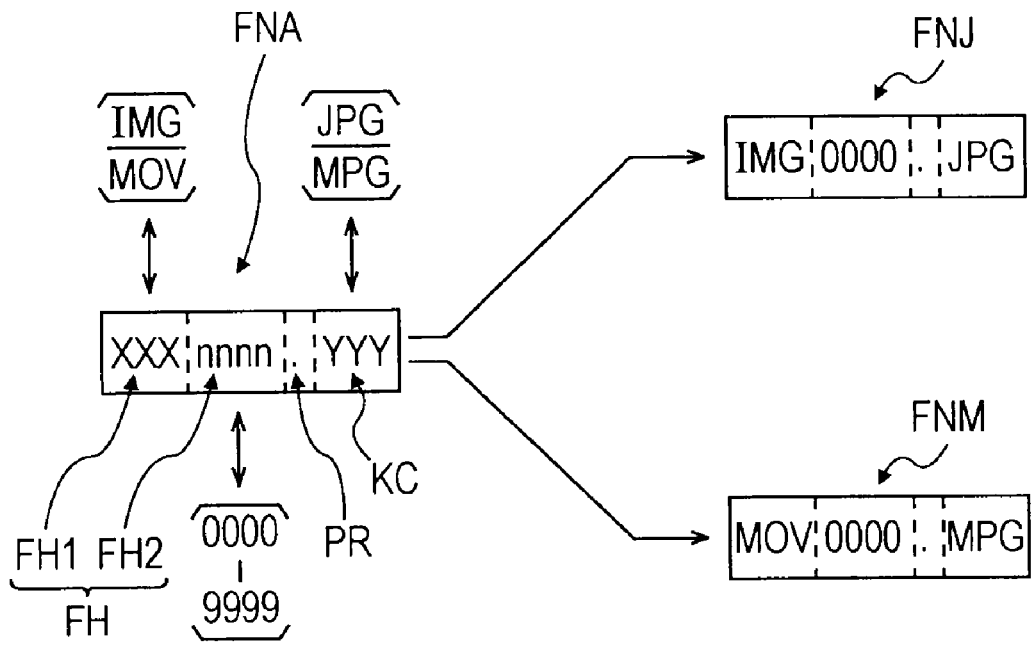
FIG. 5 is an outline drawing illustrating the configuration of a file name.

As shown in FIG. 5, a file name FNA assigned to still image files and moving image files is formed of a file name body FH followed by a period PR and suffix KC, connected in that order. In this case, the file name body FH stores file distinguishing information FH1 for distinguishing the file, i.e., whether a still image file or a moving image file, and a serial No. FH2 for numbering the still image files and moving image files.

The file distinguishing information FH1 in the file name body FH is a text string "IMG" in the case of a still image file for example, and a text string "MOV" in the case of a moving image file. Also, the suffix KC is for identifying the format of the file, which may be a text string "JPG" in the case of a still image file for example, and a text string "MPG" in the case of a moving image file. Accordingly, whether a file to which the file name FNA has been assigned is a still image file or a moving image file can be detected by the suffix KC and the file distinguishing information FH1 in the file name body FH.

Now, at the time of performing only still image shooting of a subject and generating a still image file (i.e., in the event of generating a still image file in the still image shooting mode), the CPU 10 stores a unique serial No. FH2 in the file name FNA of this still image file so as not to duplicate the serial No. of another still image file or moving image file.

Also, at the time of performing only moving image shooting of a subject and generating a moving image file (i.e., in the event of generating a moving image file in the moving image shooting mode), the CPU 10 stores a unique serial No. FH2 in the file name FNA of this moving image file so as not to duplicate the serial No. of another moving image file or a still image file.

On the other hand, at the time of performing still image shooting and moving image shooting of a subject in time division and generating a still image file and a moving image file (i.e., in the event of generating a still image file and a moving image file in the time division shooting mode), the CPU 10 stores a single unique serial No. FH2 in the file name FNJ of the still image file and the file name FNM of the moving image file so as not to duplicate the serial No. of other moving image files or still image files. That is to say, at the time of performing still image shooting and moving image shooting of a subject in time division and generating a still image file and a moving image file, the CPU 10 stores the same serial No. FH2 in the file names FNJ and FNM of the still image file and moving image file.

Thus, the CPU 10 correlates the still image file and moving image file generated by performing still image shooting and moving image shooting of a subject in time division (i.e., main still image data and main moving image data) as being generated by performing still image shooting and moving image shooting of a single subject in time division, by the same serial No. FH2 in the file names FNJ and FNM.

Also, at the time of generating main still image data in accordance with still image shooting of the subject, the image modification unit 22 subjects the main still image data to image reduction processing by thinning out pixels without changing the still image aspect ratio (i.e., reducing the still image size). Accordingly, the image modification unit 22 generates still image data of a reduced still image based on the main still image data (hereinafter, the reduced still image may be referred to as "still image thumbnail", and the still image data of the still image thumbnail may be referred to as "still image thumbnail data").

The still image thumbnail is substantially the same as the main still image prior to reduction except for the image size being different, and shows the contents of the still image. The still image thumbnail is displayed on a smaller region of the display screen 5A as compared to the main still image prior to reduction, and accordingly can be displayed on the display screen 5A along with the other still image thumbnails and so forth. Thus, the still image thumbnails can be used as an index for searching for main still image data.

Upon generating the still image thumbnail data of the still image thumbnail as described above, the image modification unit 22 sends the generated still image thumbnail data to the buffer memory 21 for temporary recording.

At the time of recording the compressed still image data as a still image file in the recording media 27, the CPU 10 reads out the corresponding still image thumbnail data from the buffer memory 21. The CPU 10 then sends the compressed still image data to the recording media 27 via the media interface 26, along with the corresponding still image thumbnail data. Accordingly, the CPU 10 records the still image thumbnail data in the recording media 27 in a manner correlated with the still image file.

Also, at the time of generating main moving image data in accordance with moving image shooting of the subject, the image modification unit 22 extracts, from the main moving image data, the main unit image data of the head unit image in time, as main unit image data of one main unit image representing the contents of the main moving image. Note that in the following description, the head unit image in time of the temporally continuous multiple main unit images making up the main moving image will in particular be referred to as "head unit image", and main image data of this head unit image will be referred to as "head unit image data".

Further, the image modification unit 22 subjects the head unit image data to image reduction by thinning out pixels without changing the moving image aspect ratio (i.e., reducing the moving image size). Accordingly, the image modification unit 22 generates head unit image data of a reduced head unit image based on the head unit image data (hereinafter, the reduced head unit image will be referred to as "unit image thumbnail", and the head unit image data of the unit image thumbnail may be referred to as "unit image thumbnail data").

The unit image thumbnail is formed with the vertical length of the image being the same as the vertical length of the still image thumbnail. Also, the unit image thumbnail is substantially the same as the head unit image prior to reduction except for the image size being different. The unit image thumbnail is displayed on a smaller region of the display screen 5A as compared to the main still image prior to reduction, and accordingly can be displayed on the display screen 5A along with the other unit image thumbnails and still image thumbnails and so forth. Thus, the unit image thumbnails can be used as an index for searching for main moving image data.

Upon generating the unit image thumbnail data of the unit image thumbnail as described above, the image modification unit 22 sends the generated unit image thumbnail data to the buffer memory 21 for temporary recording.

At the time of recording the compressed moving image stream as a moving image file in the recording media 27, the CPU 10 reads out the corresponding unit image thumbnail data from the buffer memory 21. The CPU 10 then sends the moving image stream to the recording media 27 via the media interface 26, along with the corresponding unit image thumbnail data. Accordingly, the CPU 10 records the unit image thumbnail data in the recording media 27 in a manner correlated with the moving image file.

In this way, when still image shooting or moving image shooting of a subject is performed, the CPU 10 generates and records still image thumbnail data and moving image thumbnail data along with the main still image data and main moving image data.

It should be noted that the CPU 10 provides the still image thumbnail data with correlation information storing distinguishing information capable of distinguishing the type of data (i.e., whether still image thumbnail data or unit image thumbnail data), and the same serial No. as the serial No. FN2 within the file name FNA (or FNJ) of the corresponding still image file. Also, the CPU 10 provides the unit image thumbnail data with correlation information storing distinguishing information capable of distinguishing the type of data (i.e., whether still image thumbnail data or unit image thumbnail data), and the same serial No. as the serial No. FN2 within the file name FNA (or FNM) of the corresponding moving image file.

Note that distinguishing information capable of distinguishing whether still image thumbnail data or unit image thumbnail data is a flag of a value "0" indicating still image thumbnail data or a value "1" indicating unit image thumbnail data.

In this way, the CPU 10 correlates the still image thumbnail data and unit image thumbnail data to the still image file and moving image file by correlation information. Also, the CPU 10 correlates still image thumbnail data and unit image thumbnail data generated by performing still image shooting and moving image shooting of a subject in time-division, by correlation information (i.e., by the same serial No. stored in the correlation information).

Now, when in a playback mode, in the event that an external device is not connected to the digital still camera 1 via the external terminal 8, the CPU 10 displays main still images and main moving images using the display unit 5 provided to the digital still camera 1. On the other hand, in the event that an external device is connected to the digital still camera 1 via the external terminal 8, the CPU 10 displays main still images and main moving images using the display unit provided to the external device. Accordingly, a case wherein the display unit 5 of the digital still camera 1 is used to display main still images and main moving images in playback mode will be described below, followed by description of a case wherein the display unit of an external device is used to display main still images and main moving images.

When in the playback mode, in the event that a list display command for display a list of still image thumbnails and unit image thumbnails is input by user operations from the operating unit 15 in a state wherein the digital still camera 1 is not connected to an external device, still image thumbnail data and unit image thumbnail data are read out from the recording media 27 via the media interface 26.

The CPU 10 detects correlated still image thumbnail data and unit image thumbnail data based on the correlation information added to the still image thumbnail data and unit image thumbnail data, and composites the correlated still image thumbnail data and unit image thumbnail data so as to generate composite image data (hereafter may be referred to as "composite thumbnail data"). The CPU 10 generates list display data using other uncorrelated still image thumbnail data and unit image thumbnail data, along with the composite thumbnail data. The CPU 10 then subjects the list display data to D/A conversion processing by the D/A converter 23 and sends to the display unit 5 via the display controller 24 as analog list display signals.

Figure 6:
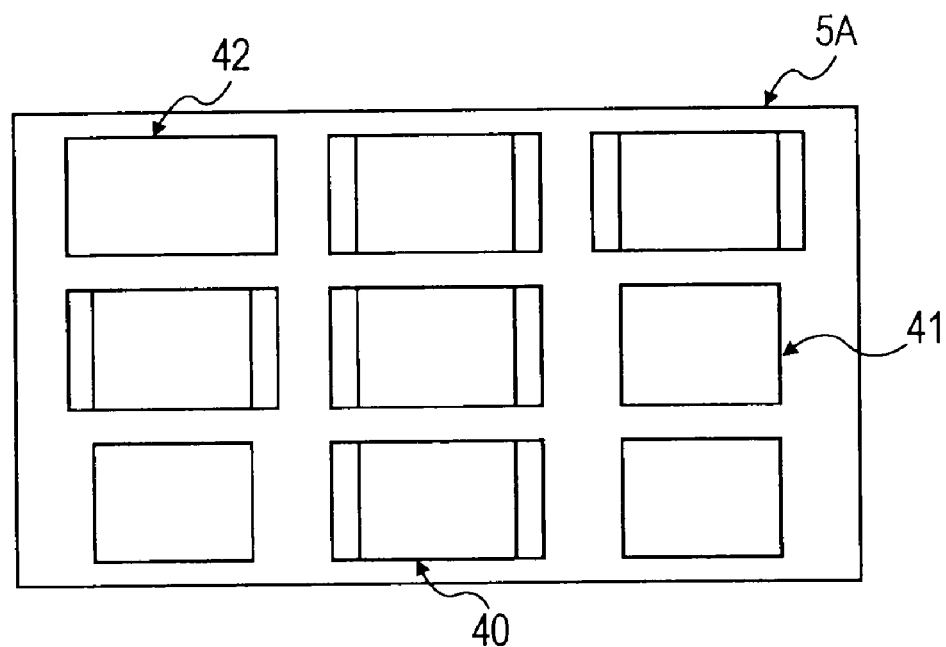
FIG. 6 is an outline drawing for describing of a list display of thumbnails.

Accordingly, the CPU 10 displays, in matrix fashion, composite thumbnails 40 based on composite thumbnail data, still image thumbnails 41 based on still image thumbnail data not correlated with others, and unit image thumbnails 42 based on unit image thumbnail data, on the display screen 5A of the display unit 5, as shown in FIG. 6, based on the list display signals.

Figure 7:
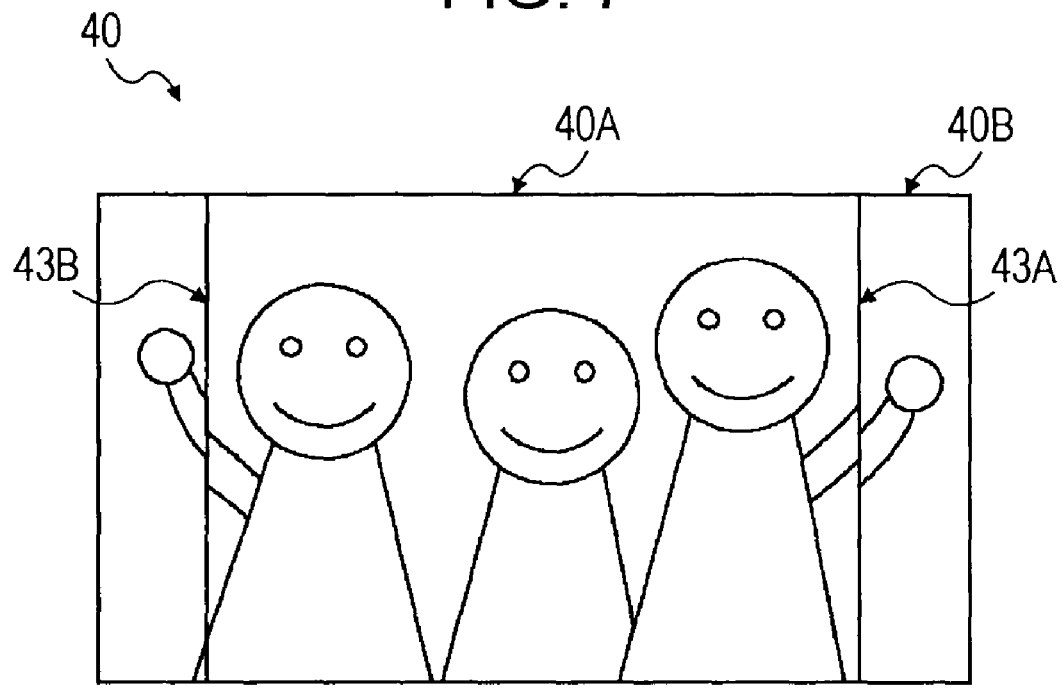
FIG. 7 is an outline drawing illustrating the configuration of a composite thumbnail.

In this case, as shown in FIG. 7, the composite thumbnail 40 is configured of the correlated still image thumbnail 40A and unit image thumbnail 40B. Specifically, the composite thumbnail 40 is formed with the still image thumbnail 40A having the still image aspect ratio being superimposed at the center portion of the unit image thumbnail 40B having the moving image aspect ratio, with the top and bottom of the two matching in the vertical direction, so as to have the moving image aspect ratio as a whole.

Note that superimposing of the unit image thumbnail 40B on the still image thumbnail 40A means a state wherein the thumbnail 40B and the still image thumbnail 40A have been composited by the center portion of the unit image thumbnail 40B being rewritten at the still image thumbnail 40A (i.e., the center portion of the unit image thumbnail 40B is rewritten over the still image thumbnail 40A).

Accordingly, with the thumbnail 40, the entire still image thumbnail 40A can be shown, and at the same time, the exposed portions of the unit image thumbnail 40B at the left end and right end which are not covered by the still image thumbnail 40A being superimposed but rather are exposed (i.e., the portions of the unit image thumbnail 40B which stick out from the still image thumbnail 40A) can also be shown.

Now, the still image thumbnail 40A which is a component of the composite thumbnail 40 has been generated by reducing the still image size of the main still image obtained by still image shooting and moving image shooting of a subject in time division, and accordingly has substantially the same picture as the main still image. Also, the unit image thumbnail 40B which is a component of the composite thumbnail 40 has been generated by reducing the moving image size of the head unit image included in the main moving image, obtained by still image shooting and moving image shooting of a subject in time division, and accordingly has substantially the same picture as the head unit image.

Still image shooting and moving image shooting of a subject in time division is performed with the moving image shooting being start immediately following still image shooting of the subject, meaning that there is a slight shift in time. Accordingly, with still image shooting and moving image shooting of a subject in time division, the greater the movement of the subject or the digital still camera 1 during shooting is, the greater the difference in pictures is between the main still image and the head unit image included in the main moving image. This means that the greater the movement of the subject or the digital still camera 1 during shooting is, the greater the difference in pictures is between the still image thumbnail 40A and unit image thumbnail 40B.

Accordingly, with the composite thumbnail 40, the greater the difference in pictures is between the still image thumbnail 40A and unit image thumbnail 40B, the greater the loss of continuity of pictures between the right and left edges of the still image thumbnail 40A, and the exposed portion of the thumbnail 40B at the right end (hereinafter, may be referred to as "right end exposed portion") and the exposed portion of the thumbnail 40B at the left end (hereinafter, may be referred to as "left end exposed portion"). This makes the boundaries between the right and left edge portions of the still image thumbnail 40A, and the right end exposed portion and left end exposed portion of the unit image thumbnail 40B more conspicuous.

However, with still image shooting and moving image shooting of a subject in time division, if there is almost no movement of the subject or the digital still camera 1 during shooting, there is almost no difference in pictures between the main still image and the head unit image included in the main moving image. This means that if there is almost no movement of the subject or the digital still camera 1 during still image shooting and moving image shooting of a subject in time division, there is almost no difference in pictures between the still image thumbnail 40A and unit image thumbnail 40B.

If there is almost no difference in pictures between the still image thumbnail 40A and unit image thumbnail 40B, the boundaries between the right and left edge portions of the still image thumbnail 40A, and the right end exposed portion and left end exposed portion of the unit image thumbnail 40B are inconspicuous. Consequently, with the composite thumbnail 40, the pictures of the right and left edge portions of the still image thumbnail 40A, and the right end exposed portion and left end exposed portion of the unit image thumbnail 40B, may be connected as if they were a single image, and may appear as being configured by the unit image thumbnail 40B alone.

Accordingly, at the time of generating a composite thumbnail 40, the CPU 10 superimposes images of relatively heavy black boundary lines 43A and 43B (hereinafter may be referred to as "boundary line images") parallel and running vertically, at the boundary portions between the right and left edge portions of the still image thumbnail 40A, and the right end exposed portion and left end exposed portion of the unit image thumbnail 40B.

Note that the CPU 10 may superimpose the boundary line images 43A and 43B on the composite thumbnail 40 at only the right end and left end of the still image thumbnail 40A, or only at the boundary portions of the right end exposed portion and left end exposed portion of the unit image thumbnail 40B with the still image thumbnail 40A. Moreover, the CPU 10 may superimpose the boundary line images 43A and 43B on the composite thumbnail 40 so as to straddle the boundary portions of the right end exposed portion and left end exposed portion of the unit image thumbnail 40B with the still image thumbnail 40A.

Accordingly, the composite thumbnail 40 clearly shows the boundary between the still image thumbnail 40A and the unit image thumbnail 40B, as the boundary line images 43A and 43B regardless of the difference in pictures between the still image thumbnail 40A and the unit image thumbnail 40B. That is to say, the CPU 10 enables the user to easily and clearly understand that the composite thumbnail 40 has a still image thumbnail 40A which is narrower than the unit image thumbnail 40B superimposed on the unit image thumbnail 40B. Thus, a composite thumbnail 40 can be readily differentiated from other uncorrelated thumbnails, the still image thumbnail 41 and unit image thumbnail 42 on the display screen 5A of the display unit 5.

Also, the CPU 10 generates the main still image with the still image aspect ratio of 4:3, and generates the multiple main unit images making up the main moving image with the moving image aspect ratio of 16:9, and superimposes the still image thumbnail 40A having the still image aspect ratio upon the unit image thumbnail 40B having the moving image aspect ratio, in the composite thumbnail 40 shown in the display screen 5A on the display unit 5. Accordingly, the CPU 10 can cause the user to intuitively recognize by the composite thumbnail 40 that the main moving image corresponding to the unit image thumbnail 40B and the still image corresponding to the still image thumbnail 40A are correlated due to still image shooting and moving image shooting having been performed of an image in time division.

The CPU 10 displays the still image thumbnails 41 and unit image thumbnails 42 along with the composite thumbnails 40 on the display screen 5A of the display unit 5, whereby the user can optionally select from the composite thumbnails 40, still image thumbnails 41, and unit image thumbnails 42, using the operating unit 15.

If we say that the user selects a still image thumbnail 41 from the composite thumbnails 40, still image thumbnails 41, and unit image thumbnails 42, displayed on the display screen 5A of the display unit 5 using the operating unit 15, the CPU 10 executes playback processing of the main still image data corresponding to the selected still image thumbnail 41. In this case, the CPU 10 reads out the compressed still image data corresponding to the selected still image thumbnail 41 from the recording media 27 via the media interface 26, and sends to the buffer memory 21 for temporary recording.

At this time, the still image processing unit 25 reads out the compressed still image data from the buffer memory 21 and generates the original main still image data by decoding the compressed still image data that has been read out, and sends the generated main still image data to the image modification unit 22.

The image modification unit 22 performs image reduction processing on the main still image data provided from the still image processing unit 25, by thinning out the pixels form the main still image without changing the still image aspect ratio. The image modification unit 22 generates main still image data where the main still image has been reduced to a still image vertical length and still image horizontal length which can be displayed on the display screen 5A of the display unit 5, and sends the generated main still image data to the CPU 10.

At this time, the CPU 10 performs D/A conversion of the main still image data provided from the image modification unit 22 by the D/A converter 23, and sends to the display controller 24 as analog main still image signals. The display controller 24 sends the main still image signals provided from the CPU 10 to the display unit 5, whereby the main still image is displayed on the display screen 5A of the display unit 5 based on the main still image signals. Thus, the CPU can play the main still image data generated by still image shooting alone of the subject, and show the main still image to the user.

After the main still image data has been played for a predetermined amount of time, the CPU 10 ends the playing processing of the still image data. In the event that a play stop command has been input before the main still image data has been played for a predetermined amount of time, the CPU 10 stops the playing of the still image data at that point, and ends the playing processing of the still image data.

Upon ending the playing processing of the still image data in this way, the CPU 10 displays list display of the composite thumbnails 40, still image thumbnails 41, and unit image thumbnails 42 on the display screen 5A of the display unit 5 again, so that the user can select main still image data and main moving image data to be played from the composite thumbnails 40, still image thumbnails 41, and unit image thumbnails 42 on the display screen 5A of the display unit 5.

If we say that the user selects a unit image thumbnail 42 from the composite thumbnails 40, still image thumbnails 41, and unit image thumbnails 42, displayed on the display screen 5A of the display unit 5 using the operating unit 15, the CPU 10 executes playback processing of the main moving image data corresponding to the selected unit image thumbnail 42. In this case, the CPU 10 reads out the compressed moving image data corresponding to the selected unit image thumbnail 42 from the recording media 27 via the media interface 26, and sends to the buffer memory 21 for temporary recording. The CPU 10 splits the moving image stream into compressed image data and compressed audio data, and sends the compressed image data and compressed audio data to the buffer memory 21 to be temporarily recorded.

At this time, the moving image processing unit 28 reads out the compressed moving image data from the buffer memory 21 and generates the original main moving image data by decoding the compressed moving image data that has been read out, and sends the generated main moving image data to the image modification unit 22.

The image modification unit 22 subjects the main moving image data to image reduction processing wherein pixels are thinned out from the main moving image without changing the aspect ratio. Thus, the image modification unit 22 generates main still image data where the main moving image has been reduced to a moving image vertical length and moving image horizontal length which can be displayed on the display screen 5A of the display unit 5, and sends the generated main moving image data to the CPU 10.

At this time, the CPU 10 performs D/A conversion of the main moving image data provided from the image modification unit 22 (i.e., the sequence of multiple main unit image data) by the D/A converter 23, and sends to the display controller 24 as analog main moving image signals (i.e., multiple main unit image signals). The display controller 24 sends the main moving image signals (i.e., the sequence of multiple main unit image data) provided from the CPU 10 to the display unit 5, whereby the main moving image is displayed on the display screen 5A of the display unit 5 based on the main moving image signals (i.e., by sequentially switching the main unit images based on the temporally continuous multiple main unit image signals).

Also, at this time, the audio processing unit 31 reads compressed audio data out from the buffer memory 21 and decodes the compressed audio data that has been read out, and generates the original audio data. The audio processing unit 31 then performs D/A conversion processing of the audio data with the D/A converter 33 as analog audio signals and sends to a speaker 34, whereby the audio based on the audio signals can be output from the speaker 34 along with the display of the main moving image on the display screen 5A of the display unit 5.

Thus, the CPU 10 can play the main still image data and audio data generated by moving image shooting alone of the subject, and present the main moving image and audio to the user.

After the main moving image data and audio data has been played to the end, the CPU 10 ends the playing processing of the moving image data. In the event that a play stop command has been input before the main moving image data and audio data has been played to the end, the CPU 10 stops the playing of the moving image data at that point, and ends the playing processing of the moving image data.

Upon ending the playing processing of the moving image data in this way, the CPU 10 displays list display of the composite thumbnails 40, still image thumbnails 41, and unit image thumbnails 42 on the display screen 5A of the display unit 5 again, so that the user can select main still image data and main moving image data to be played from the composite thumbnails 40, still image thumbnails 41, and unit image thumbnails 42 on the display screen 5A of the display unit 5.

If we say that the user selects a composite thumbnail 40 from the composite thumbnails 40, still image thumbnails 41, and unit image thumbnails 42, displayed on the display screen 5A of the display unit 5 using the operating unit 15, the CPU 10 executes playback processing of the main still image data and the main moving image data corresponding to the selected composite thumbnail 40.

In this case, the CPU 10 reads out the compressed still image data corresponding to the selected composite thumbnail 40 (i.e., the still image thumbnail 40A which is a component of the composite thumbnail 40) from the recording media 27 via the media interface 26, and sends to the buffer memory 21 for temporary recording. Also, the CPU 10 reads out the moving image stream corresponding to the selected composite thumbnail 40 (i.e., the moving image thumbnail 40B which is a component of the composite thumbnail 40) from the recording media 27 via the media interface 26. The CPU 10 further splits the moving image stream into the compressed moving image data and compressed audio data, and also sends the compressed moving image data to the buffer memory 21 for temporary recording.

That is to say, the CPU 10 reads out the correlated compressed moving image data (i.e., main still image data) and the moving image stream (i.e., main moving image data) from the recording media 27 along with the still image thumbnail 40A and moving image thumbnail 40B.

At this time, the still image processing unit 25 reads out the compressed still image data from the buffer memory 21 and generates the original main still image data by decoding the compressed still image data that has been read out, and sends the generated main still image data to the image modification unit 22. Also, the moving image processing unit 28 reads out the compressed moving image data from the buffer memory 21 and generates the original main moving image data by decoding the compressed moving image data that has been read out, and sends the generated main moving image data to the image modification unit 22.

The image modification unit 22 performs image reduction processing on the main still image data provided from the still image processing unit 25, by thinning out the pixels form the main still image without changing the still image aspect ratio. The image modification unit 22 generates main still image data where the main still image has been reduced to a still image vertical length and still image horizontal length which can be displayed on the display screen 5A of the display unit 5, and sends the generated main still image data to the CPU 10.

Also, the image modification unit 22 subjects the main moving image data to image reduction processing wherein pixels are thinned out from the main moving image without changing the aspect ratio. Thus, the image modification unit 22 generates main still image data where the main moving image has been reduced to a moving image vertical length and moving image horizontal length which can be displayed on the display screen 5A of the display unit 5.

At this time, the image modification unit 22 performs image reduction processing on both the main still image data and the head unit image data, thereby generating main still image data and the head unit image data of the main still image and main head unit image so that the still image vertical length and moving image vertical length are the same. The image modification unit 22 then sends the head unit image data which has been subjected to image reduction processing in this way to the CPU 10.

At this time, the CPU 10 generates composite image data of a composite image by compositing the main still image data provided from the image modification unit 22 and the head unit image data (hereinafter, composite image data may be referred to as "main composite image data", and the composite image of the composite image data may be referred to as "main composite image").

Figure 8:
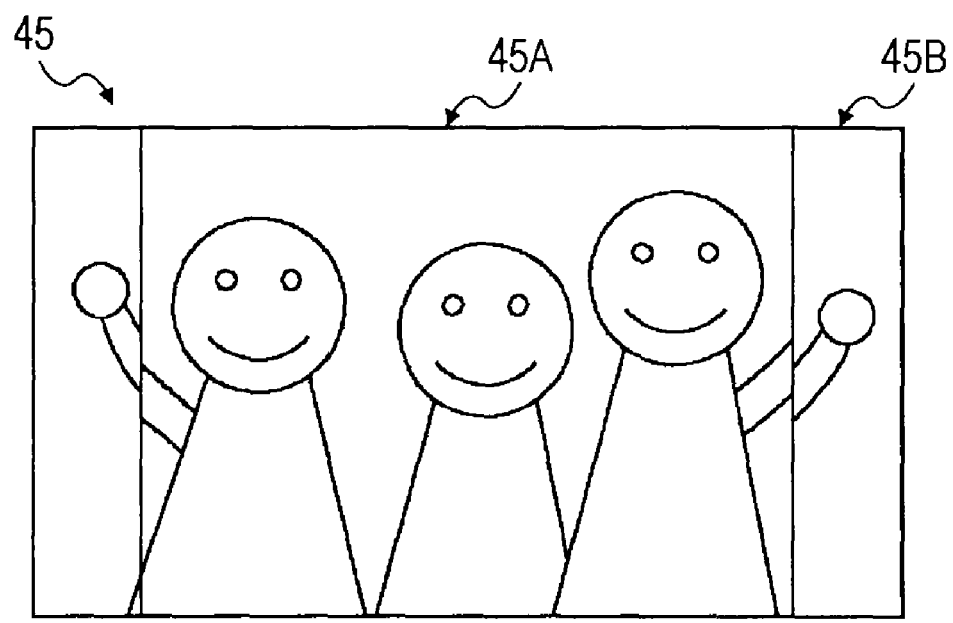
FIG. 8 is an outline drawing illustrating the configuration of a main composite image.

At this time, the CPU 10 performs D/A conversion of the main composite image data by the D/A converter 23, and sends to the display controller 24 as analog main composite image signals. The display controller 24 sends the main composite image signals provided from the CPU 10 to the display unit 5, whereby a main composite image 45 such as shown in FIG. 8, is displayed on the entirety of the display screen 5A of the display unit 5 based on the main composite image signals.

At this time, the main composite image 45 is configured of a correlated main still image 45A and head unit image 45B (i.e., the head unit image 45B serving as the main moving image that is correlated with the main still image 45A). Specifically, the main composite image 45 is formed with the still image thumbnail 45A having the still image aspect ratio being superimposed at the center portion of the head unit image thumbnail 45B having the moving image aspect ratio, with the top and bottom of the two matching in the vertical direction, so as to have the moving image aspect ratio as a whole.

Note that superimposing of the head unit image thumbnail 45B on the still image thumbnail 45A means a state wherein the head unit image thumbnail 45B and the still image thumbnail 45A have been composited by the center portion of the head unit image thumbnail 45B being rewritten at the still image thumbnail 45A (i.e., the center portion of the head unit image thumbnail 45B is rewritten over the still image thumbnail 45A).

Accordingly, with the thumbnail 45, the entire still image thumbnail 45A can be shown, and at the same time, the exposed portions of the head unit image thumbnail 45B at the left end and right end which are not covered by the still image thumbnail 45A being superimposed but rather are exposed (i.e., the portions of the head unit image thumbnail 45B which stick out from the still image thumbnail 45A) can also be shown.

At the time of executing continuous playback processing of correlated main still image data and main moving image data, the CPU 10 first plays the main still image data along with the head unit image data of the main moving image as main composite data and displays the main composite image 45, and accordingly can shown the user the main still image 45A with the main composite image 45.

Figure 9:
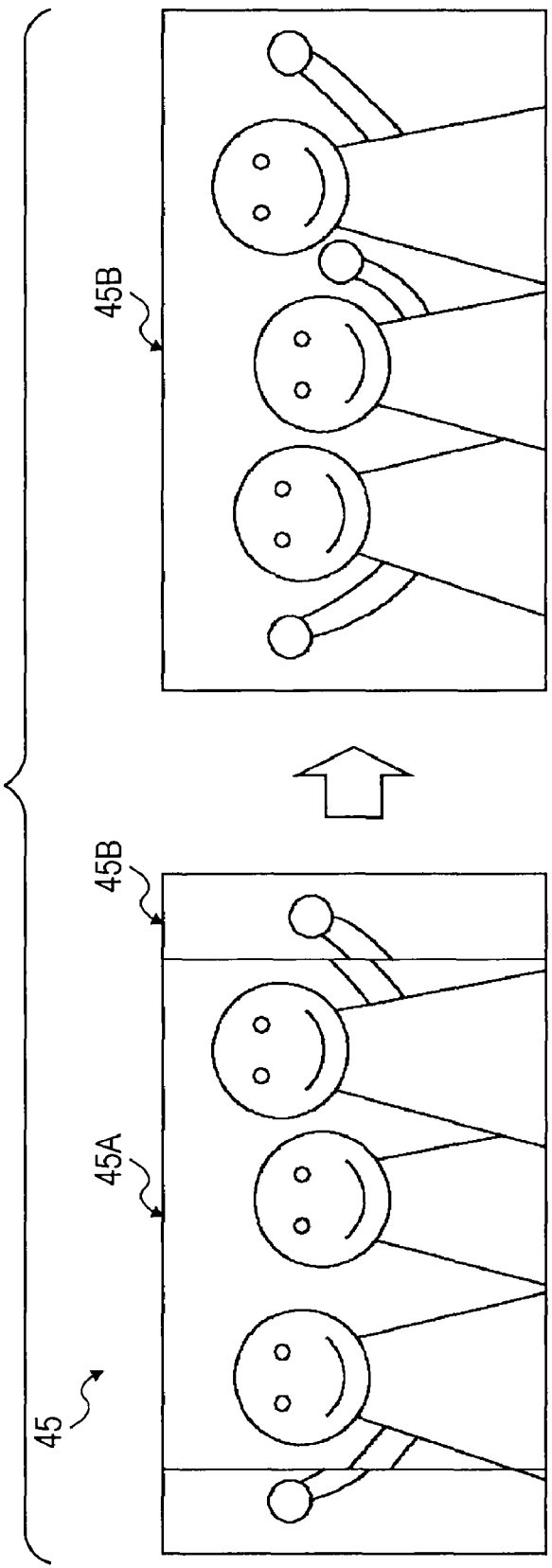
FIG. 9 is an outline drawing for description of switching (1) from display of a main composite image to a main moving image.

As shown in FIG. 9, upon the main composite image 45 being displayed on the display screen 5A of the display unit 5 for a predetermined amount of time, the CPU 10 subjects only the head unit image data of the head unit image 45B, instead of the main composite image data, to D/A conversion with the D/A converter 23 and sends to the display controller 24 as analog head unit image signals. Accordingly, the display controller 24 sends the head unit image signals provided from the CPU 10 to the display unit 5, and display only the head unit image 45B based on the head unit image signals, on the entire display screen 5A of the display unit 5.

Thus, the CPU 10 switches from a display of the main composite image 45 on the display screen 5A of the display unit 5, to a display of, out of the main still image 45A and head unit image 45B making up the composite image 45, the head unit image 45B alone. Upon switching the display from the main composite image 45 to the head unit image 45B on the display screen 5A of the display unit 5 in this way, the CPU 10 starts playing processing of the moving image stream in the same way as described above.

Thus, the CPU 10 controls the moving image processing unit 28 and the image modification unit 22 to generate main moving image data, and also controls the audio processing unit 31 to generate audio data. Consequently, upon main moving image data being provided form the image modification unit 22, the CPU 10 performs D/A conversion processing of the main moving image data with the D/A convert 23 and sends to the display controller 24 as analog main moving image signals. Accordingly, the display controller 24 sends the main moving image signals provided form the CPU 10 to the display unit 5, thereby display a main moving image based on main moving image signals on the display screen 5A of the display unit 5, instead of the head unit image 45B.

Also, the CPU 10 performs D/A conversion processing of the audio data generated by the audio processing unit 31 with the D/A converter 33 and sends to a speaker 34 as analog audio signals, whereby the audio based on the audio signals can be output from the speaker 34 along with the display of the main moving image on the display screen 5A of the display unit 5.

Thus, the CPU 10 can play, of the main still image data and the main moving image data generated by still image shooting and moving image shooting of a subject in time division, the main still image data first, and following this, can automatically play the main moving image data as well.

In the event of automatically continuously playing the correlated main moving image data and main moving image data, when the main moving image has been played to the end, the CPU 10 ends the playing processing of the moving image data. In the event that a play stop command has been input partway through playing of the main moving image data by the user, the CPU 10 stops the playing of the moving image data at that point, and ends the playing processing of the moving image data.

Upon ending the continuous playing processing in this way, the CPU 10 displays the list display of the composite thumbnails 40, still image thumbnails 41, and unit image thumbnails 42 on the display screen 5A of the display unit 5 again, so that the user can select main still image data and main moving image data to be played from the composite thumbnails 40, still image thumbnails 41, and unit image thumbnails 42 on the display screen 5A of the display unit 5.

Now, in the event of displaying the main composite image 45 on the display screen 5A of the display unit 5, the CPU 10 superimposes the main still image 45A having the still image aspect ratio on the head unit image 45B having the moving image aspect ratio in the main composite image 45. Accordingly, the user can intuitively recognize, from the main composite image 45, that the main moving image corresponding to the head unit image 45B and the main still image 45A are correlated by still image shooting and moving image shooting of a subject in time division.

That is to say, while the CPU 10 can cause the user to recognize that the main still image 45A and the main moving image are correlated by the composite thumbnail 40 displayed on the display screen 5A of the display unit 5, the fact that the main still image 45A and the main moving image are correlated can be recognized from the main composite image 45 as well.

However, with the main composite image 45, if there is almost no difference in pictures between the main still image 45A and head unit image 45B, as with the case of the composite thumbnail 40, the pictures of the right and left edge portions of the main still image 45A, and the right end exposed portion and left end exposed portion of the head unit image 45B, may be connected as if they were a single image, and may appear as being configured by the head unit image 45B alone.

Accordingly, while the CPU 10 may generate the main composite image 45 such that the main still image 45A is simply superimposed on the head unit image 45B (FIG. 8), at least one of the main still image 45B and the head unit image 45B may be subjected to superimposition enhancement processing so as to emphasize superimposing of the main still image 45A onto the head unit image 45B. The CPU 10 may allow the user to optionally select whether or not to execute superimposition enhancement processing at the time of generating the main composite image 45, or may allow the user to select and set whether or not to automatically determine whether or not to execute superimposition enhancement.

Also, several types of superimposition enhancement to be performed on at least one of the main still image 45A and the head unit image 45B can be conceived. Accordingly, in the event that execution of superimposition enhancement has been set beforehand, or in the event that whether or not to execute superimposition enhancement is to be determined automatically, one superimposition enhancement processing to be performed on at least one of the main still image 45A and the head unit image 45B can be selected from multiple types of superimposition enhancement and set by the user.

Now, in the same way as with the above-described composite thumbnail 40, there is superimposition enhancement processing wherein boundary line images are superimposed on at least of the main still image 45A and the head unit image 45B.

Figure 10:
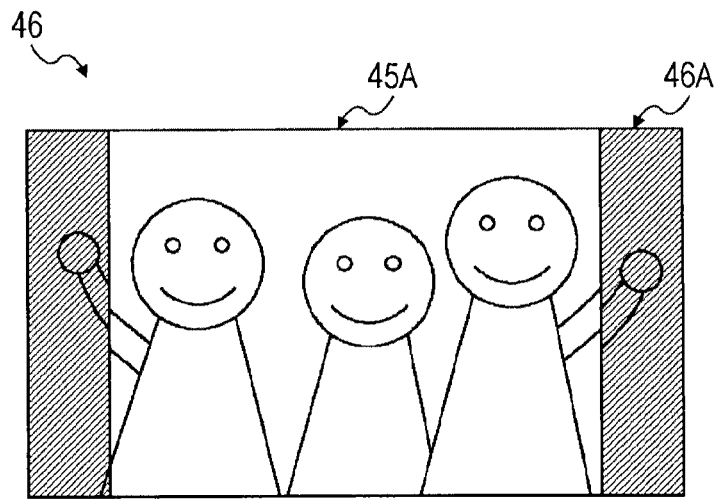
FIG. 10 is an outline drawing for description of superimposition enhancement processing (1) with a main composite image.

Another type of superimposition enhancement is to change at least the right end exposed portion and left end exposed portion of the main still image 46A to a brightness different from the original brightness (i.e., to lower the brightness from that of the original), as shown in FIG. 10. With this superimposition enhancement, the brightness of the head unit image 46A is lower (i.e., darker) than the main still image 45A in the main composite image 46, so the main still image 45A serving as the center portion and the head unit image 46A serving as the background (i.e., the right end exposed portion and left end exposed portion of the head unit image 46A) are clearly differentiated, and the boundaries therebetween can be clearly distinguished.

Figure 11:
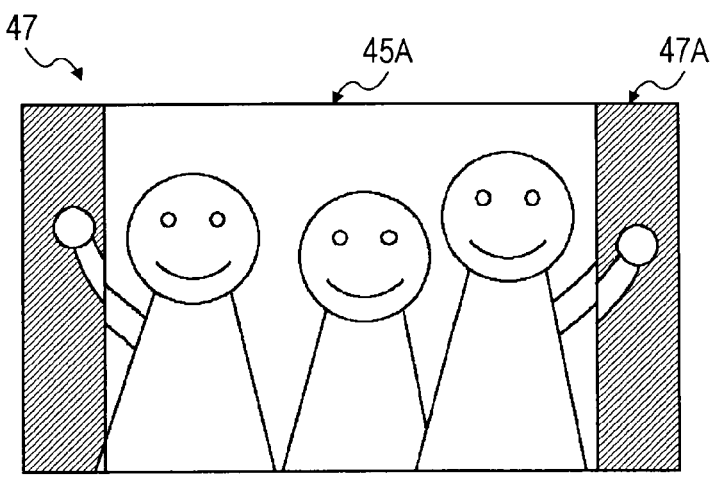
FIG. 11 is an outline drawing for description of superimposition enhancement processing (2) with a main composite image.

Yet another type of superimposition enhancement is to change at least the right end exposed portion and left end exposed portion of the main still image 47A to a color saturation different from the original color saturation (i.e., to lower the color saturation from that of the original), as shown in FIG. 11. With this superimposition enhancement, the color saturation of the head unit image 47A is lower (i.e., b/w or faded) than the main still image 45A in the main composite image 47, so the main still image 45A serving as the center portion and the head unit image 47A serving as the background (i.e., the right end exposed portion and left end exposed portion of the main still image 47A) are clearly differentiated, and the boundaries therebetween can be clearly distinguished.

Yet another type of superimposition enhancement is to change at least the right end exposed portion and left end exposed portion of the main still image 47A to a hue different from the original hue. With this superimposition enhancement, the hue of the head unit image 47A is different from the main still image 45A in the main composite image 47, so the main still image 45A serving as the center portion and the head unit image 47A serving as the background (i.e., the right end exposed portion and left end exposed portion of the main still image 47A) are clearly differentiated, and the boundaries therebetween can be clearly distinguished.

Figure 12:
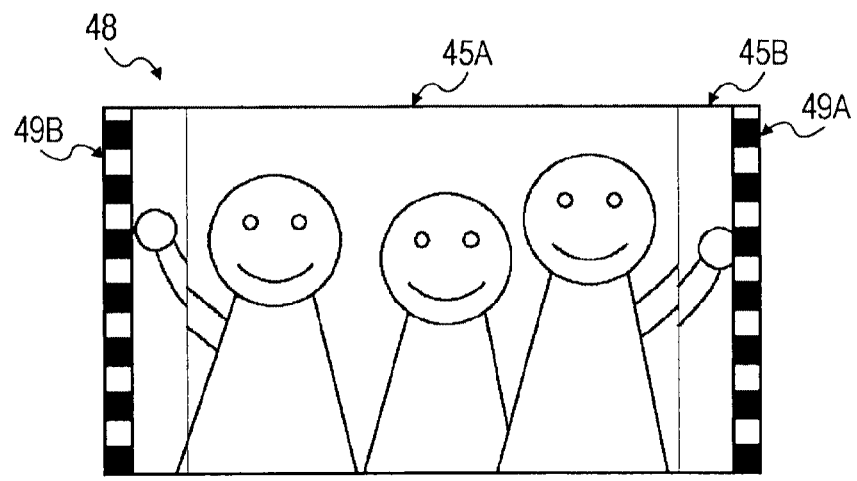
FIG. 12 is an outline drawing for description of superimposition enhancement processing (3) with a main composite image.

Yet another type of superimposition enhancement is to superimpose ornamental images 49A and 49B reminiscent of movie film edges one part of the right end exposed portion and left end exposed portion of the head unit image 47A, as shown in FIG. 12. With this superimposition enhancement as well, the main composite image 48 can be clearly differentiated from other cases of displaying only the main still image or only the main moving image, due to displaying of the ornamental images 49A and 49B.

In the event that settings have been made beforehand to execute superimposition enhancement processing, the CPU 10 performs one of the above-described superimposition enhancement processing on at least one of the main still image 45A and head unit image 47A in accordance with user settings, and generates main composite images 46 through 48.

Also, in the event that whether or not to execute superimposition enhancement processing has been set to be automatically determined, the CPU 10 compares the pixels at the main still image 45A and the head unit image 45B adjacent with each other at the boundary portions at the right end and left end portions of the main still image 45A and the right end exposed portion and left end exposed portion of the head unit image 45B.

The CPU 10 compares pixels at the boundary portions between the main still image 45A and the head unit image 45B, detects the percentage of pixels where the difference in pixel value (e.g., brightness or color) of the compared pixels exceeds a preset difference. In the event that the results thereof show that the percentage of pixels values at the boundaries of the main still image 45A and the head unit image 45B which exceed a preset difference are at or exceed a certain threshold value, determination is made that the difference in the picture between the main still image 45A and the head unit image 45B is relatively great. In this case, the CPU 10 does not perform superimposition enhancement processing on the main still image 45A and the head unit image 45B, since the boundaries between the main still image 45A and the head unit image 45B can be clearly distinguished simply by superimposing.

On the other hand, in the event that the results thereof show that the percentage of pixels values at the boundaries of the main still image 45A and the head unit image 45B which exceed a preset difference are below the certain threshold value, determination is made that the difference in the picture between the main still image 45A and the head unit image 45B is relatively small. In this case, the CPU 10 performs one of the above-described superimposition enhancement processing on at least one of the main still image 45A and head unit image 45B in accordance with user settings, and generates main composite images 46 through 48, since the boundaries between the main still image 45A and the head unit image 45B are not readily distinguished by simple superimposing.

As shown in FIGS. 13 through 15, in the event of executing continuous playback processing in a state wherein the main composite images 46 through 48 subjected to superimposition enhancement processing (i.e., with brightness, color saturation, or hue changed, or ornamental images 49A and 49B superimposed) are displayed on the display screen 5A of the display unit 5, switching of the display of the main composite images 46 through 48 to display of the head unit image 45B alone (i.e., erasing of the main still image 45A) and canceling of the superimposition enhancement processing effects on the head unit images 45B, 46A, and 47A (i.e., restoring the head unit image 45B to that before the superimposition enhancement processing), are performed, not necessarily in that order, in accordance with user settings.

Upon switching of the main composite images 46 through 48 on the display screen 5A of the display unit 5 to the head unit image 45B alone making up the main composite images 46 through 48, the CPU 10 automatically starts moving image stream playing processing in the same way as described above, after displaying the head unit image 45B alone.

However, in the event of executing continuous playback processing in a state wherein a main composite image 48 is displayed on the display screen 5A of the display unit 5, having been subjected to superimposition enhancement processing wherein the ornamental images 49A and 49B are superimposed on the head unit image 45B, as shown in FIG. 16, the display of the main composite image 48 is switched to the display of the head unit image 45B alone which makes up the main composite image 48 (i.e., the main still image 45A is erased), in accordance with user settings.

Also, the CPU 10 may keep the superimposition enhancement processing effects on the head unit image 45B displayed alone on the display screen 5A of the display unit 5 from being canceled(i.e., to keep the ornamental images 49A and 49B superimposed on the head unit image 45B). Also, in the event that playing processing of the moving image stream is started following switching from the display of the main composite image 48 on the display screen 5A of the display unit 5 to the display of the head unit image 45B with the ornamental images 49A and 49B superimposed on the head unit image 45B, the CPU 10 may perform display of the main moving image with the ornamental images 49A and 49B left displayed according to user settings. Further, the CPU 10 may perform display of the main moving image on the display screen 5A of the display unit 5 without the ornamental images 49A and 49B superimposed.

Note that at the time of displaying the main composite images 45 through 48 on the display screen 5A of the display unit 5, the CPU 10 generates main composite image data at the buffer memory 21, for example. Specifically, the CPU 10 renders the head unit image data in the buffer memory 21 by temporarily recording the head unit image data in the buffer memory 21, thereby forming head unit images 45B, 46A, and 47A. The CPU 10 concurrently proceeds with rendering head unit image data in the buffer memory 21 and reading out the head unit image data from the buffer memory 21 as main composite image data.

Also, upon ending temporary recording of the head unit image data in the buffer memory 21, the CPU 10 concurrently proceeds with temporary recording of the main still image data in the buffer memory 21 while rendering the main still image data in the buffer memory 21 and overwriting the main still image 45A at the center portion of the head unit images 45B, 46A, and 47A (i.e., superimposing).

Further, the CPU 10 concurrently proceeds with temporary recording of the main still image data in the buffer memory 21 while reading out the portion of the main still image data that has already been temporarily recording, along with the head unit image data, from the buffer memory 21, as main composite image data.

Accordingly, the amount of time from one main composite thumbnail 40 being arbitrarily selected from the display screen 5A of the display unit 5 by user operation of the operating unit 15 till display of the main composite image 45 through 48 on the display screen 5A of the display unit 5 is reduced greatly.

However, this means that after reading out the head unit image data and main still image data as main composite image data from the buffer memory 21, the contents of the main composite images 45 through 48 displayed on the display screen 5A of the display unit 5 are gradually changed from a display of only the head unit images 45B, 46A, and 47A, to that with the main still image 45A superimposed. If the CPU 10 executes display of the main composite images 45 through 48 on the display screen 5A of the display unit 5 at a relatively high speed in accordance with the processing capabilities thereof, the contents of the main composite images 45 through 48 may appear to flicker, which may reduce visual recognition.

Accordingly, during the time from the user having arbitrarily selected one composite thumbnail 40 from the display screen 5A of the display unit 5 by the operating unit 15, till the head unit image data and main still image data being sequentially recorded in the buffer memory 21 and generating of the main composite image data being completed, the CPU 10 executes generating of the main composite image data and sending of this to the display controller 24, but turns the display screen 5A of the display unit 5 off (i.e., the display screen 5A is in a turned-off state). At the point that the generating of the main composite image data is complete, the CPU 10 turns the display screen 5A of the display unit 5 on (i.e., the display screen 5A is in a turned-on state) so as to display the main composite images 45 through 48.

Accordingly, the CPU 10 avoids contents of the main composite images 45 through 48 flickering when displayed on the display screen 5A of the display unit 5 which may lead to reduced visual recognition. Also, the CPU 10 executes display of the list display of the composite thumbnails 40, still image thumbnails 41, and unit image thumbnails 42, described above, with similar display control of the display screen 5A of the display unit 5.

On the other hand, when in the playback mode, in the event that a list display command for display a list of still image thumbnails and moving image thumbnails is input by user operations from the operating unit 15 in a state wherein the digital still camera 1 is connected to an external device, still image thumbnail data and unit image thumbnail data are read out from the recording media 27 via the media interface 26. The CPU 10 then generates the list display data in the same way as above, and sequentially outputs the generated list display data to the external device via the external interface 35 and external terminal 8.

Accordingly, the CPU 10 displays, in matrix fashion, composite thumbnails 40, still image thumbnails 41, and unit image thumbnails 42, on the display screen of the external device, as shown in FIG. 6, based on the list display signals.

If we say that the user selects a still image thumbnail 41 from the composite thumbnails 40, still image thumbnails 41, and unit image thumbnails 42, displayed on the display screen of the external device using the operating unit 15, the CPU 10 executes playback processing of the main still image data corresponding to the selected still image thumbnail 41. In this case, the CPU 10 controls the still image processing unit 25 and image modification unit 22 in the same way as above to generate the main still image data.

Upon main still image data being provided from the image modification unit 22, the main still image data is output to the external device via the external interface 35 and external terminal 8. Thus, the CPU 10 can display the main still image of the main still image data on the display screen of the display unit of the external device so as to be viewed by the user.

Also, if the user selects a unit image thumbnail 42 from the composite thumbnails 40, still image thumbnails 41, and unit image thumbnails 42, displayed on the display screen of the external device using the operating unit 15, the CPU 10 executes playback processing of the main moving image data corresponding to the selected unit image thumbnail 42. In this case, the CPU 10 controls the moving image processing unit 28 and image modification unit 22 to generate the main moving image data, and also controls the audio processing unit 31 to generate audio data.

Upon main moving image data being provided from the image modification unit 22, the main moving image data is output to the external device via the external interface 35 and external terminal 8. Also, the CPU 10 acquires the audio data from the audio processing unit 31, and also outputs the audio data to the external device via the external interface 35 and external terminal 8. Thus, the CPU 10 can display the main moving image of the main moving image data on the display screen of the display unit of the external device, and output audio based on the audio data from a speaker of the external device along with the display of the main moving image, so as to be viewed by the user.

Further, if the user selects a composite thumbnail 40 from the composite thumbnails 40, still image thumbnails 41, and unit image thumbnails 42, displayed on the display screen of the external device using the operating unit 15, the CPU 10 executes continuous playback processing of the main still image data and main moving image data corresponding to the selected composite thumbnail 40. In this case, the CPU 10 controls the still image processing unit 25, moving image processing unit 28, and image modification unit 22 in the same way as above to generate the head unit image and main still image data.

Upon main still image data and head unit image data being provided from the image modification unit 22, the main unit image data and the main still image data are composited and main composite image data is generated. The CPU 10 then sequentially outputs the generated composite image data to the external device via the external interface 35 and external terminal 8. Thus, the CPU 10 can display the main composite images 45 through 48 on the display screen of the display unit of the external device, based on the main composite image data.

The CPU 10 thus displays the main composite images 45 through 48 at the external device by playing the correlated main still image data and the head unit image data of the main moving image data, so the user can see the main still image 45A as the composite images 45 through 48.

Upon the main composite images 45 through 48 being displayed at the external device for a predetermined amount of time, the CPU 10 switches the display of the main composite images 45 through 48 on the external device to a display of only the head unit image 45B out of the main still image 45A and head unit image 45B making up the main composite images 45 through 48, and then switching to display of the main moving image, and also outputting audio along with the display of the main moving image, as described above. Accordingly, following playing of the main still image data, the CPU 10 can also automatically play the main moving image data correlated with this main still image data, so as to be viewed by the user.

In the case of displaying the main still image and main moving image at an external device as well, as described above, upon ending the continuous playing processing in this way, the CPU 10 displays the list display of the composite thumbnails 40, still image thumbnails 41, and unit image thumbnails 42 on the display screen of the display unit of the external device again, so that the user can select main still image data and main moving image data to be played from the composite thumbnails 40, still image thumbnails 41, and unit image thumbnails 42 on the display screen 5A of the display unit 5.

Next, composite thumbnail display processing procedures RT1 for displaying the composite thumbnail 40 when in the playback mode will be described with reference to the flowchart shown in FIG. 17.

Figure 17:
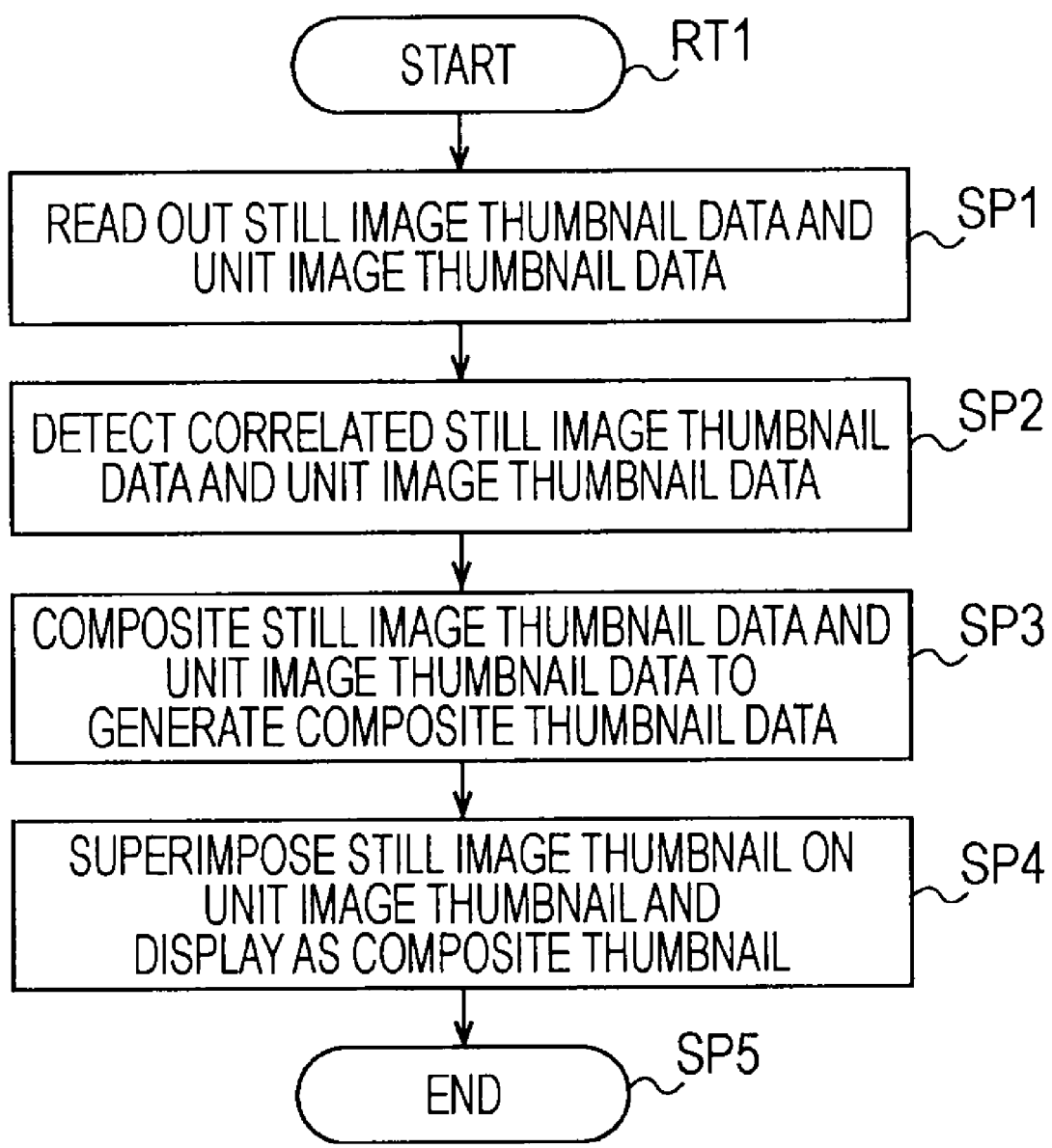
FIG. 17 is a flowchart illustrating procedures for composite thumbnail display processing.

Upon a list display command being input by user operations at the operating unit 15 for example, the CPU 10 starts the composite thumbnail display processing procedures RT1 shown in FIG. 17 following a display control program stored in the ROM 12 beforehand.

Upon starting the composite thumbnail display processing procedures RT1, in step SP1 the CPU 10 reads out multiple sets of still image thumbnail data and multiple sets of unit image thumbnail data from the recording media 27, and proceeds to the next step SP2.

In step SP2, the CPU 10 detects correlated still image thumbnail data and unit image thumbnail data from the multiple sets of still image thumbnail data and multiple sets of unit image thumbnail data, and proceeds to the next step SP3.

In step SP3, the CPU 10 composites the correlated still image thumbnail data and unit image thumbnail data to generate composite thumbnail data, and proceeds to the next step SP4.

In step SP4, the CPU 10 sends the composite thumbnail data along with other still image thumbnail data and unit image thumbnail data to the display unit 5 of the digital still camera 1 (or an external device), as list display data. Thus, the CPU 10 displays a still image thumbnail 40A having a still image aspect ratio superimposed on a portion of a unit image thumbnail 40B having a moving image aspect ratio, as a composite thumbnail 40, and also displays other still image thumbnails 41 and unit image thumbnails 42 as a list, based on list display data, on the display screen 5A of the display unit 5 (of the display screen of the display unit of an external device), and proceeds to the next step SP5.

In step SP5, the CPU 10 ends the composite thumbnail display processing procedures RT1.

Next, continuous playback processing procedures RT2 for continuous playback of correlated main still image data and main moving image data in the playback mode will be described with reference to the flowchart shown in FIG. 18.

Figure 18:
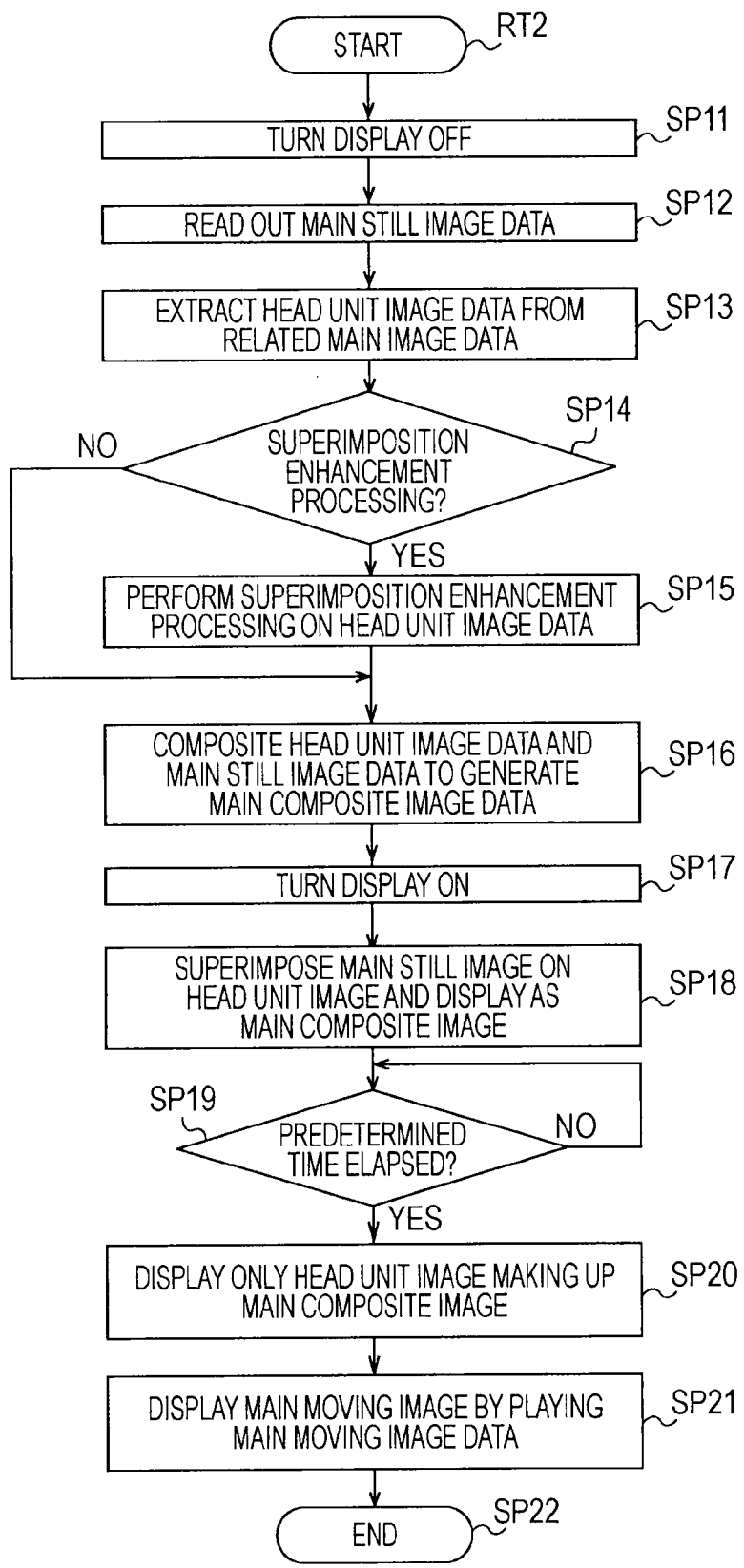
FIG. 18 is a flowchart illustrating procedures for continuous playback processing.

In a state wherein a composite thumbnail 40 is displayed on the display screen 5A of the display unit 5 (or display screen of the display unit of an external device), upon the composite thumbnail 40 being selected on the display screen 5A (or display screen of the display unit of the external device) by user operations at the operating unit 15, the CPU 10 starts the continuous playback processing procedures RT2 shown in FIG. 18, following a display control program stored in the ROM 12 beforehand.

Upon the continuous playback processing procedures RT2 starting, in step SP11 the CPU 10 turns the display screen 5A of the display unit 5 (or display screen of the display unit of the external device) to an off state, and proceeds to the next step SP12.

In step SP12, the CPU 10 reads out, from the correlated compressed still image data and moving image stream corresponding to the composite thumbnail 40 selected by the user, the compressed still image data, from the recording media 27. The CPU 10 then generates main still image data based on the compressed still image data, with the still image processing unit 25 and image modification unit 22, and proceeds to the next step SP13.

In step SP13, the CPU 10 reads out, from the correlated compressed still image data and moving image stream corresponding to the composite thumbnail 40 selected by the user, the moving image stream, from the recording media 27. The CPU 10 generates head unit image data based on the compressed moving image included in the moving image stream, with the moving image processing unit 28 and image modification unit 22, and proceeds to the next step SP14.

In step SP14, the CPU 10 determines whether or not to perform superimposition enhancement processing on at least one of the main still image data and head data.

Positive results being obtained in step SP14 means that the user has performed settings beforehand so as to perform superimposition enhancement processing, or that determination has been automatically made based on the pixels of the main still image 45A and the head unit image 45B that superimposition enhancement processing should be performed. In the event of obtaining such positive results, the CPU 10 proceeds to the next step S15.

In step SP15, the CPU 10 performs superimposition enhancement processing on the head unit image data of the correlated main still image data and head unit image data, for example, and proceeds to the next step SP16.

In step SP16, the CPU 10 composites the correlated main still image data and head unit image data to generated main composite data, and proceeds to the next step SP17.

On the other hand, negative results being obtained in step SP14 means that the user has neither performed settings beforehand so as to perform superimposition enhancement processing (or has made settings to the contrary), nor has determination has been automatically made based on the pixels of the main still image 45A and the head unit image 45B that superimposition enhancement processing should be performed. In the event of obtaining such negative results in step SP14, the CPU 10 skips the processing in step S15, and proceeds to step SP16.

Note that while executing the processing of step SP16 and generating main composite image data, the CPU 10 also is sending the main composite image data to the display unit 5 of the digital still camera 1 (or to the external device).

Upon generating of the main composite data being completed, in step SP17 the CPU 10 turns the display screen 5A of the display unit 5 (or the display screen of the display unit of the external device) on, and proceeds to step SP18.

In step SP18, the CPU 10 displays the main still image 45A having a still image aspect ratio superimposed on a portion of the head unit images 45B, 46A, and 47A having a moving image aspect ratio, as main composite images 45 through 48 based on main composite image data, on the display screen 5A of the display unit 5 (of the display screen of the display unit of the external device). Thus, the CPU 10 enables the user to view the main still image 45A out of the correlated main still image 45A and main moving image, as main composite images 45 through 48, and proceeds to the next step SP19.

In step SP19, the CPU 10 stands by for a certain period of time following starting of display of the main composite images 45 through 48, and upon the certain period of time elapsing, proceeds to the next step SP20.

In step SP20, the CPU 10 displays only the head unit image 45B making up the main composite images 45 through 48, instead of the main composite images 45 through 48, on the on the display screen 5A of the display unit 5 (of the display screen of the display unit of the external device), with the effects of superimposition enhancement cancelled, and proceeds to the next step SP21.

In step SP21, the CPU 10 starts playing of the main moving image data correlated with the main still image data of the main still image 45A shown to the user up to that point. Accordingly, the CPU 10 can generate main moving image data correlating the main still image data along with the compressed moving image data, by the moving image processing unit 28 and image modification unit 22, and sends the generated main moving image data to the display unit 5 (or the external device). Thus, the CPU can display the main moving image based on the main moving image data to be displayed on the display screen 5A of the display unit 5 (of the display screen of the display unit of the external device), instead of the head unit image 45B.

Now, in the event that playing of the main moving image data has ended, or playing thereof has been canceled in response to a play stop request, the CPU 10 proceeds to the next step SP22.

In step SP22, the CPU 10 ends the continuous playback processing procedures RT2.

1-3. Operations and Advantages

With the above-described configuration, in the event that the CPU of the digital still camera 1 performs still image shooting and moving image shooting of a subject in time division, the CPU 10 generates main still image data of the main still image 45A having a still image aspect ratio, and main moving image data of a main moving image formed of multiple temporally continuous main unit images having a moving image aspect ratio which is different form the still image aspect ratio, and correlates these.

Also, the CPU 10 of the digital still camera 1 generates still image thumbnail data of the still image thumbnail 40A having a still image aspect ratio, as an index to be used for searching of the still image data, of the correlated main still image data and main moving image data.

Further, the CPU 10 of the digital still camera 1 generates unit image thumbnail data of the unit image thumbnail 40B having a moving image aspect ratio, as an index to be used for searching of the moving image data, of the correlated main still image data and main moving image data.

Moreover, the CPU 10 of the digital still camera 1 correlates the still image thumbnail data and unit image thumbnail data, and records the correlated still image thumbnail data and unit image thumbnail data along with the main still image data and main moving image data.

The CPU 10 of the digital still camera 1 then composites the correlated still image thumbnail data and unit image thumbnail data when in the playback mode to generate composite thumbnail data.

Also, the CPU 10 of the digital still camera 1 sends the composite thumbnail data to the display unit 5 (or external device), so that the still image thumbnail 40A is displayed superimposed on a portion of the unit image thumbnail 40B, as the composite thumbnail 40 based on the composite thumbnail data, on the display screen 5A of the display unit 5 (or display screen of the display unit of the external device).

Accordingly, the CPU 10 of the digital still camera 1 can perform a display on the display screen 5A of the display unit 5 (or display screen of the display unit of the external device) such that the still image thumbnail 40A and unit image thumbnail 40B showing the content of the correlated main still image and main moving image are displayed as the composite thumbnail 40 in a manner that can be distinguished from other still image thumbnails and moving image thumbnails showing the content of uncorrelated main still images and main moving images.

Accordingly, the CPU 10 of the digital still camera 1 can enable the main still image and main moving image generated by still image shooting and moving image shooting of a subject in time division, and correlated, to be easily distinguished from main still images and main moving images obtained by still image shooting and moving image shooting being performed individually of the subject.

According to the above configuration, the digital still camera 1 generates a composite thumbnail 40 by compositing the still image thumbnail 40A having a still image aspect ratio corresponding to the main still image and the unit image thumbnail 40B having a moving image aspect ratio still image corresponding to the main moving image, for the correlated main still image and main moving image, and displays on the display screen 5A of the display unit 5 (or display screen of the display unit of the external device), the still image thumbnail 40A superimpose on a portion of the unit image thumbnail 40B, as the composite thumbnail 40.

Accordingly, the digital still camera 1 can display on the on the display screen 5A of the display unit 5 (or display screen of the display unit of the external device) the still image thumbnail 40A and unit image 40B corresponding to the correlated main still image and main moving image, as the composite thumbnail 40, in a manner which can be distinguished from other still image thumbnails and moving image thumbnails showing the content of uncorrelated main still images and main moving images. Thus, the digital still camera 1 enables the user to easily distinguish correlated main still images and main moving images.

Also, with the digital still camera 1, upon the composite thumbnail 40 being selected at the display screen 5A of the display unit 5 (or display screen of the display unit of the external device), the main still image data and the head unit image data included in the main moving image data are composited and main composite thumbnail data is generated regarding the correlated main still image data and main moving image data.

The digital still camera 1 sends the main composite image data to the display screen 5A of the display unit 5 (or display screen of the display unit of the external device), and displays the main still image 45A on a portion of the head unit image 45B as the main composite image 45 based on the main composite image data, on the display screen 5A of the display unit 5 (or display screen of the display unit of the external device).

Accordingly, in the event of displaying the main composite image 45 on the display screen 5A of the display unit 5 (or display screen of the display unit of the external device) as well, the digital still camera 1 can still display the main still image and head unit image of the correlated main still image and main moving image, in a manner so as to be distinguished from uncorrelated still images and head unit images of main moving images. Accordingly, the digital still camera 1 enables the user to easily distinguish correlated man still images and main moving images.

Further, the digital still camera 1 displays on the display screen 5A of the display unit 5 (or display screen of the display unit of the external device) the right end portion and left end portion in the horizontal direction of the head unit image 45B so as tot protrude from the right end and left end of the main still image 45A in the horizontal direction, as the main composite image 45.

Upon a certain amount of time having elapsed following display of the main composite image 45 on the display screen 5A of the display unit 5 (or display screen of the display unit of the external device), the head unit image 45B out of the main still image 45A and head unit image 45B making up the main composite image 45 is displayed alone, and following displaying the head unit image 45B, the main moving image data is automatically played, so that the main moving image of which the head unit image is a part, is displayed instead of the head unit image 45B.

Accordingly, at the time of automatically continuously playing a correlated main still image and main moving image, and switching from the main still image 45A to the main moving image of which the aspect ratios are different, sudden change in the overall image shape and image length (vertical length and horizontal length) sequentially displayed on the display screen 5A of the display unit 5 (or display screen of the display unit of the external device) giving an unnatural sensation can be avoided.

Further, at the time of generating a composite thumbnail 40, the digital still camera 1 subjects at least one of the head unit image 45B and the main still image 45A to superimposition enhancement processing. Accordingly, at the time of displaying the composite thumbnail 40 at the display screen 5A of the display unit 5 (or display screen of the display unit of the external device), the digital still camera 1 enables the user to clearly distinguish the boundary of a unit image thumbnail 49B and still image thumbnail 40A due to effects to the superimposition enhancement processing, even in a case wherein the pictures of the unit image thumbnail 40B and the still image thumbnail 40A to be superimposed thereupon are almost the same in the composite thumbnail 40.

Consequently, the digital still camera 1 can avoid a situation wherein the composite thumbnail 40 is erroneously recognized as a unit image thumbnail 42 which has he same moving image aspect ratio and is independently displayed, making it difficult to distinguish the still image thumbnail 40A and unit image thumbnail 40B corresponding to the correlated main still image and main moving image from other still image thumbnails and unit image thumbnails corresponding to uncorrelated main still images and main moving images.

Further with the digital still camera 1, at the time of generating the main composite image 45, superimposition processing is performed on at least one of the main still image 45A and head unit image 45B. Accordingly, at the time of displaying the main composite image 45 on the display screen 5A of the display unit 5 (or display screen of the display unit of the external device), the digital still camera 1 enables the boundary of the head unit image 45B and the main still image 45A to be clearly distinguished due to the superimposition enhancement processing effects, even in the event that the pictures of the head unit image 45B and the main still image 45A to be superimposed thereupon in the main composite image 45 are almost the same.

Accordingly, in the case of displaying the main composite image 45 as well, the digital still camera 1 can avoid the main composite image 45 being erroneously recognized as a head unit image 45B on which a main still image 45A is not superimposed, which would make distinguishing of correlated main still images and main moving images from other uncorrelated main still images and main moving images difficult.

Other Embodiments 2-1. Second Embodiment

With the first embodiment described above, a case has been described of correlating main still image data and main moving image data obtained by performing still image shooting and moving image shooting of a subject in time division, but the present invention is not restricted to this arrangement, and an arrangement may be made wherein main still image data and main moving image data obtained by performing still image shooting and moving image shooting of a subject in time division may be arbitrarily selected and correlated in accordance with date-and-time of shooting, location of shooting, the subject, and so forth, for example.

In the event that the main still image data and main moving image data are arbitrarily selected and correlated in this way, the correlated main still image data and main moving image data can still be distinguished with other uncorrelated main still image data and main moving image data by the composite thumbnail 40 and main composite image 45.

Additionally, the present invention is not restricted to correlation of a single main still image data and a single main moving image data, and the number of at least one of the main still image data and main moving image data may be two or more.

Figure 19A:
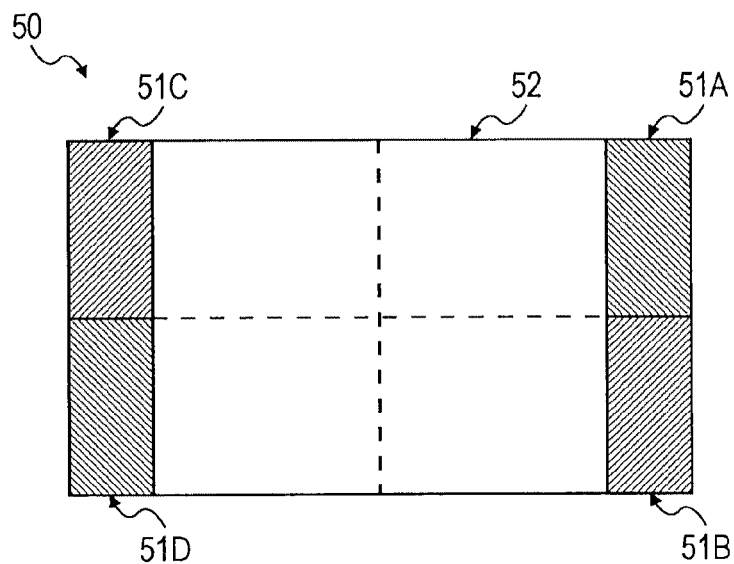
FIGS. 19A through 19C are outline drawings for description of the display of a main still image and a main unit image of a main moving image that are correlated, according to another embodiment.

In the case of this configuration, as shown in FIG. 19A, an arrangement may be made wherein, for example, one main still image (or one still image thumbnail) 52 is superimposed and displayed on a portion of each head unit image (or unit image thumbnail) of multiple main moving images, as a main composite image (or composite thumbnail) 50, on the display screen 5A of the display unit 5 (or display screen of the display unit of an external device).

Figure 19B:
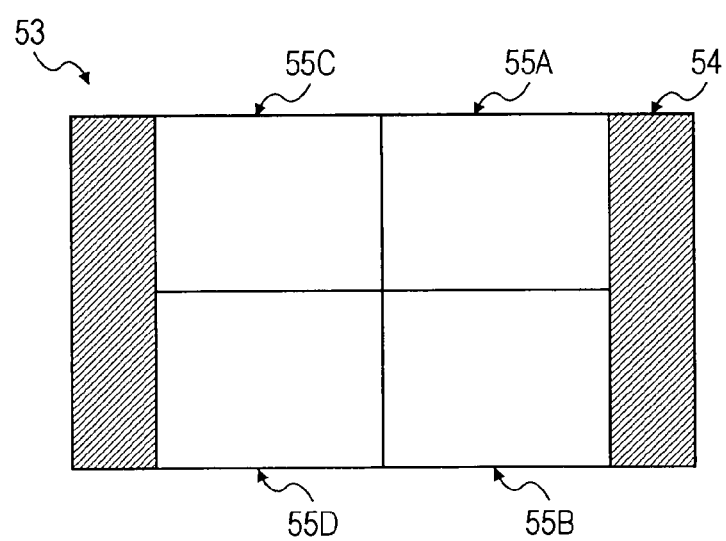

Alternatively, in the case of this configuration, as shown in FIG. 19B, an arrangement may be made wherein, for example, multiple main still images (or multiple still image thumbnails) 55A through 55D are superimposed and displayed on a portion of the head unit image (or unit image thumbnail) 54 of a single main moving image, as a main composite image (or composite thumbnail) 53, on the display screen 5A of the display unit 5 (or display screen of the display unit of an external device).

Figure 19C:
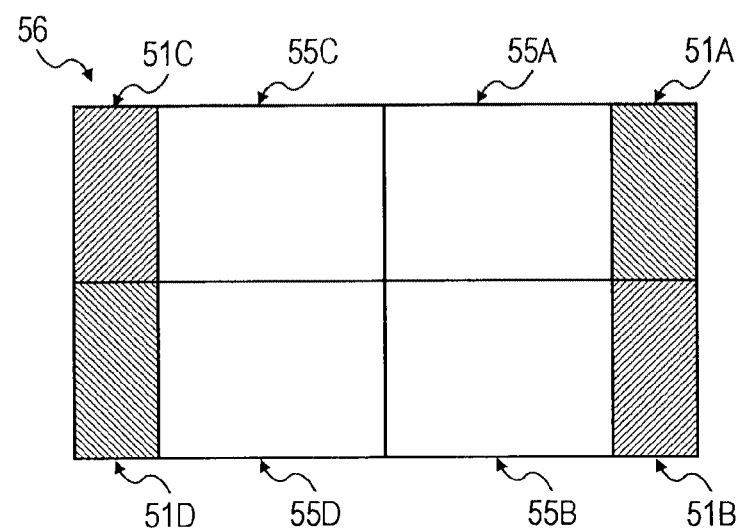

Alternatively, in the case of this configuration, as shown in FIG. 19C, an arrangement may be made wherein, for example, multiple main still images (or multiple still image thumbnails) 55A through 55D are superimposed and displayed on a portion of each head unit image (or unit image thumbnail) 51A through 51D of multiple main moving images, as a main composite image (or composite thumbnail) 56, on the display screen 5A of the display unit 5 (or display screen of the display unit of an external device).

2-2. Third Embodiment

Figure 20:
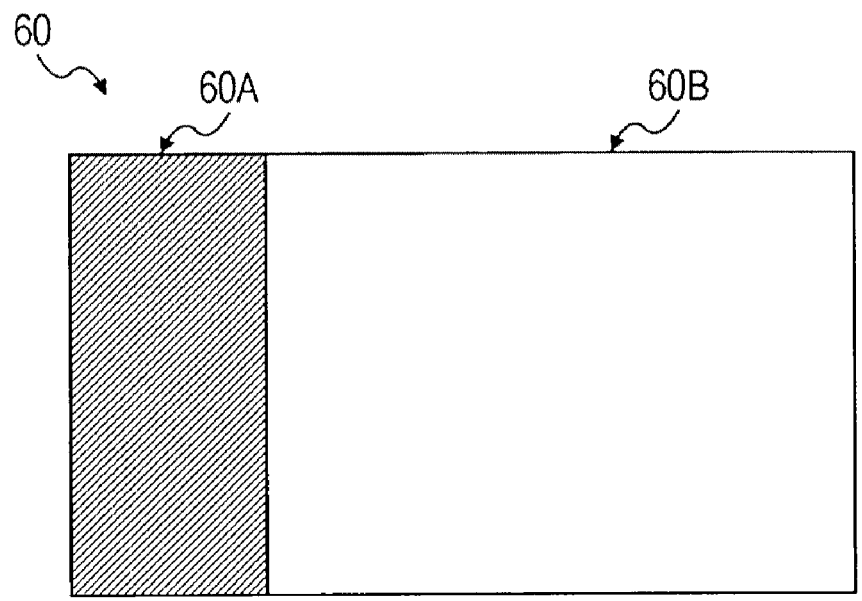
FIG. 20 is an outline drawing illustrating a main composite image configuration (1) according to another embodiment.
Figure 21:
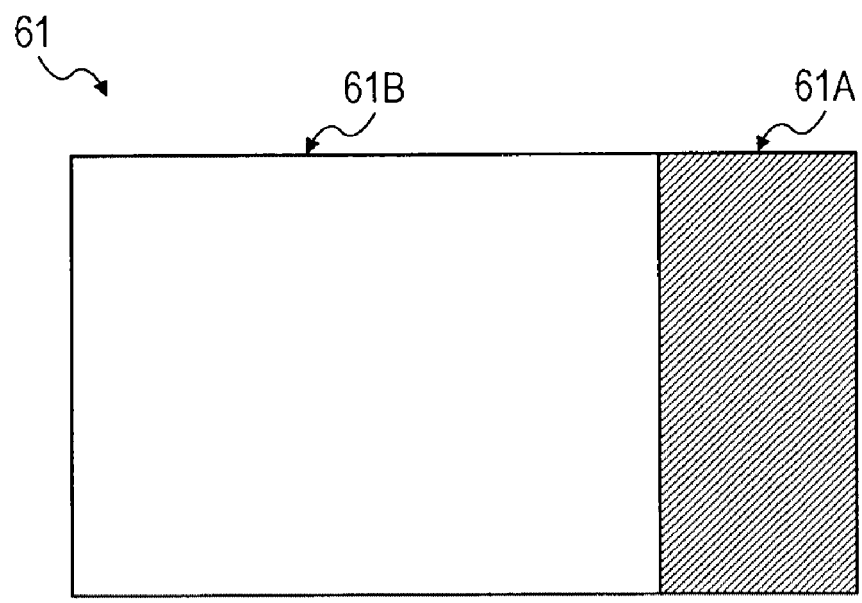
FIG. 21 is an outline drawing illustrating a main composite image configuration (2) according to another embodiment.

Also, while the first embodiment has been described as having the main still image 45A (or still image thumbnail 40A) superimposed and displayed at the center portion of the head unit image 45B (or head unit image thumbnail 40B) as the main composite image 45 (or composite thumbnail 40) on the display screen 5A of the display unit 5 (or display screen of the display unit of an external device), the present invention is not restricted to this arrangement, and an arrangement may be made, as shown in FIG. 20, wherein the main still image 60B (or still image thumbnail) is superimposed and displayed flush right on the head unit image 60A (or head unit image thumbnail) as the main composite image 60 (or composite thumbnail) on the display screen 5A of the display unit 5 (or display screen of the display unit of an external device). Alternatively an arrangement may be made, as shown in FIG. 21, wherein the main still image 61B (or still image thumbnail) is superimposed and displayed flush left on the head unit image 61A (or head unit image thumbnail) as the main composite image 61 (or composite thumbnail) on the display screen 5A of the display unit 5 (or display screen of the display unit of an external device).

Figure 22:
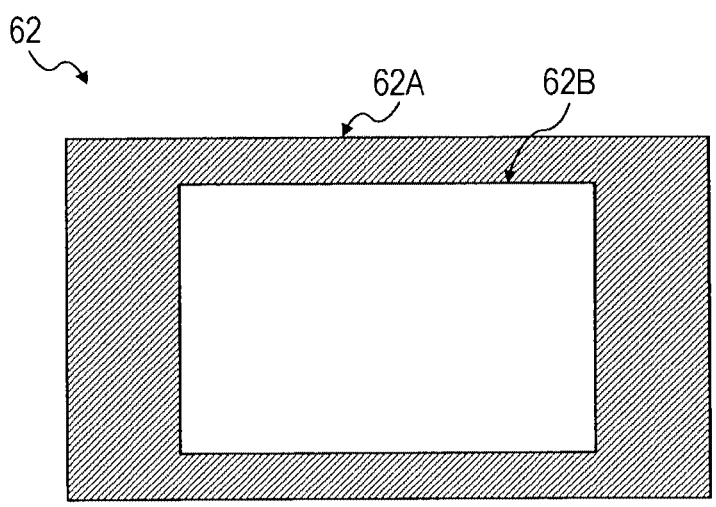
FIG. 22 is an outline drawing illustrating a main composite image configuration (3) according to another embodiment.

Also, an arrangement may be made, as shown in FIG. 22, wherein a main still image 62B (or still image thumbnail) having a still image vertical length shorter than the moving image vertical length of the head unit image 62A is superimposed and displayed at the center portion of the head unit image 62A, as the main composite image 62 (or composite thumbnail) on the display screen 5A of the display unit 5 (or display screen of the display unit of an external device).

2-3. Fourth Embodiment

Figure 23:
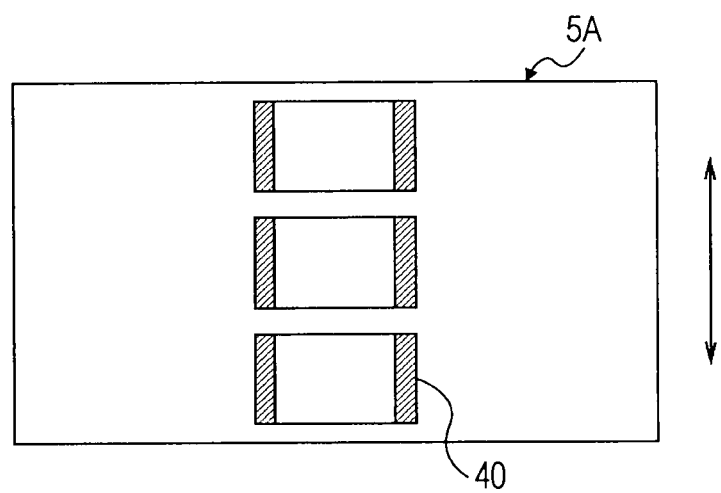
FIG. 23 is an outline drawing for description of a composite thumbnail display (1) according to another embodiment.
Figure 24:
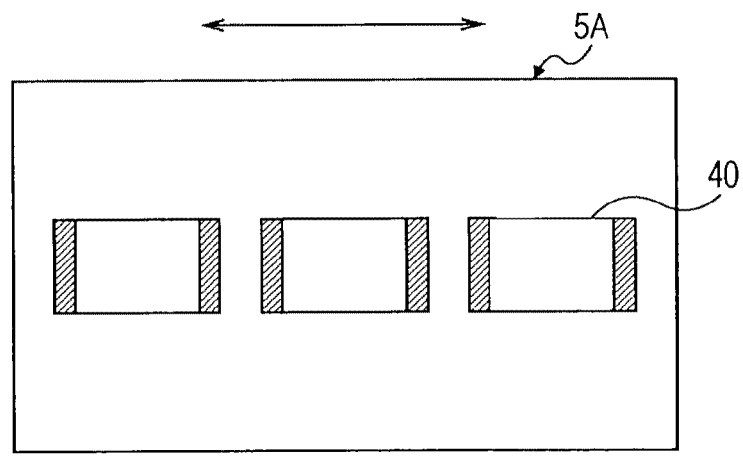
FIG. 24 is an outline drawing for description of a composite thumbnail display (2) according to another embodiment.

Also, while the first embodiment has been described as displaying on the display screen 5A of the display unit 5 (or display screen of the display unit of an external device), in matrix fashion, composite thumbnails 40, still image thumbnails 41, and unit image thumbnails 42, in response to input of a list display command, however, the present invention is not restricted to this arrangement, and as shown in FIGS. 23 and 24 for example, t least the composite thumbnails may be displayed in one column in the vertical direction of the screen or in one row in the horizontal direction of the screen, so as to be scrolled as suitable.

2-4. Fifth Embodiment

Also, while the first embodiment has been described as the still image thumbnail 40A being displayed superimposed on a portion of the unit image thumbnail 40B such that a portion of the unit image thumbnail 40B is replaced with the still image thumbnail 40A (i.e., the still image thumbnail 40A is overwritten on a portion of the unit image thumbnail 40B) as the composite thumbnail displayed on the display screen 5A of the display unit 5 (or display screen of the display unit of an external device), the present invention is not restricted to this arrangement, and an arrangement may be made wherein the still image thumbnail 40A is displayed superimposed on a portion of the unit image thumbnail 40B such that the portion of the unit image thumbnail 40B is transmitted (i.e., in a state wherein the portion of the unit image thumbnail 40B is visible through the still image thumbnail 40A), as the composite thumbnail 40 displayed on the display screen 5A of the display unit 5 (or display screen of the display unit of an external device). Also, with the main composite image 45 as well, and an arrangement may be made wherein the main still image 45A is displayed superimposed on a portion of the head unit image 45B such that the portion of the head unit image 45B is transmitted (i.e., in a state wherein the portion of the head unit image 45B is visible through the main still image 45A), as the main composite image 45 displayed on the display screen 5A of the display unit 5 (or display screen of the display unit of an external device).

2-5. Sixth Embodiment

Further, a description has been made above with the first embodiment regarding an arrangement wherein a list display is made of composite thumbnails 40, still image thumbnails 41, and unit image thumbnails 42, on the display screen 5A of the display unit 5 (or display screen of the display unit of an external device), such that the main still image data or main moving image data to be played can be selected therefrom, but the present invention is not restricted to this arrangement, and an arrangement may be made wherein, for example, the list display of composite thumbnails 40, still image thumbnails 41, and unit image thumbnails 42, is not made, with the main still image data and main moving image data being played in the order of date-and-time of recording, for example, regardless of whether correlated or not.

An arrangement may further be made wherein the main still image data and main moving image data are automatically continuously played with the main composite image 45 displayed as described above, only in the event that correlated main still image data and main moving image data are to be played.

2-6. Seventh Embodiment

Further, while a description has been made above with the first embodiment regarding an arrangement wherein the head unit image data of the multiple sets of main unit image data included in the main moving image data is sued for generating the composite thumbnail 40 or main composite image 45, the present invention is not restricted to this arrangement, and an arrangement may be made wherein, of the multiple sets of main unit image data included in the main moving image data, main unit image data which is temporally later than the head unit image data (main unit image data at the end, or main unit image data between the head unit image data and the end unit image data).

2-7. Eighth Embodiment

Further, while a description has been made above with the first embodiment regarding an arrangement wherein correlated main still image data and main moving image data are automatically continuously played, and upon playing of the main moving image data ending, the display returns to the list display, the present invention is not restricted to this arrangement, and an arrangement may be made wherein correlated main still image data and main moving image data are automatically continuously played, and upon playing of the main moving image data ending, the main composite image 45 is displayed again. In the case of this arrangement, the main composite image 45 to be displayed at the point of playing of the main moving image data ending may be generated by compositing of the main moving image data with main unit image data other than the head unit image data included in the main moving image data (e.g., the end main unit image data).

2-8. Ninth Embodiment

Further, while a description has been made above with the first embodiment regarding an arrangement wherein a list display is made of composite thumbnails 40, still image thumbnails 41, and unit image thumbnails 42, on the display screen 5A of the display unit 5 (or display screen of the display unit of an external device), and in the event that the user arbitrarily selects a composite thumbnail 40, the correlated main still image data and main moving image data corresponding to the selected composite thumbnail 40 are automatically continuously played, the present invention is not restricted to this arrangement, and an arrangement may be made wherein, at the time of still image shooting and moving image shooting of a subject in time division for example, image reduction processing is performed on each of the multiple main unit image data making of the main moving image data.

With this arrangement, moving image data (hereinafter referred to as "moving image thumbnail data") of a moving image (hereinafter referred to as "moving image thumbnail") formed of multiple unit image thumbnails that are temporally continuous (i.e., multiple unit image thumbnail data) is generated, with this moving image thumbnail data being correlated with the still image thumbnail data and recorded.

With this arrangement, a list display is made of composite thumbnails 40, still image thumbnails 41, and unit image thumbnails 42, on the display screen 5A of the display unit 5 (or display screen of the display unit of an external device), and in the event that the user arbitrarily selects a composite thumbnail 40, the list display is maintained for example, with only the unit image thumbnail 40B of the still image thumbnail 40A and unit image thumbnail 40B making yup the composite thumbnail 40 being displayed instead of the selected composite thumbnail 40, following which the moving image thumbnail data is automatically played.

Accordingly, with this arrangement, a moving image thumbnail based on the moving image thumbnail data (i.e., multiple unit image thumbnails which are temporally continuous) is displayed on the display screen 5A of the display unit 5 (or display screen of the display unit of an external device), instead of the unit image thumbnail 40B which is a component of the composite thumbnail 40.

Thus, an arrangement may be made wherein, in the state that a list display is made of composite thumbnails 40, still image thumbnails 41, and unit image thumbnails 42, on the display screen 5A of the display unit 5 (or display screen of the display unit of an external device), correlated still image thumbnail data and moving image thumbnail data are automatically continuously played as composite thumbnail data and moving image thumbnail data.

According to this configuration, even in a state wherein a list display is made of composite thumbnails 40, still image thumbnails 41, and unit image thumbnails 42, on the display screen 5A of the display unit 5 (or display screen of the display unit of an external device), the main moving image data correlated to the main still image data can be played as moving image thumbnail data, so that the main moving image based on the main moving image data is shown as a moving image thumbnail.

Also, an arrangement may be made wherein, as shown in FIG. 25, a playlist 70 is compiled with multiple sets of correlated main still image data and main moving image data being registered by file name, in order. An arrangement may be further made herein, where the main still image data is played as main composite image data, following which the main moving image data is automatically played, for each correlated main still image data and main moving image data, following the playlist (i.e., playing of main composite image data serving as the main still image data, and playing of main moving image data, is alternated in order).

Note that the playlist 70 shown in FIG. 25 may be formed into a file for example, and managed with a file name (e.g., LINK0000.DAT). With this file name, a serial No. can be stored in the file name body, so as to be capable of individually managing multiple types of playing files.

2-9. Tenth Embodiment

Further, while a description has been made above with the first embodiment regarding an arrangement wherein main moving image data of a main moving image having a moving image aspect ratio of 16:9 and main still image data of a main still image having a still image aspect ratio of 4:3 are generated, the present invention is not restricted to this arrangement, and an arrangement may be made wherein main moving image data of main moving images having moving image aspect ratios and main still image data of main still images having still image aspect ratios of different types are generated, such as main moving image data of a main moving image having a moving image aspect ratio of 4:3, and main still image data of a main still image having a still image aspect ratio if 3:2, for example, being generated.

2-10. Eleventh Embodiment

Further, while a description has been made above with the first embodiment regarding an arrangement wherein, when main moving image data and main still image data are generated by still image shooting and moving image shooting of s subject, still image thumbnail data and unit image thumbnail data are also generated, the present invention is not restricted to this arrangement, and an arrangement may be made wherein the still image thumbnail data and unit image thumbnail data are generated at the time of a request for a list display of composite thumbnails 40, still image thumbnails 41, and unit image thumbnails 42, and the composite thumbnail is generated using these.

2-11. Twelfth Embodiment

Further, while a description has been made above with the first embodiment regarding an arrangement wherein one image data for still image shooting is subjected to trimming processing (or cropping processing), and subjected to image reduction processing, so as to generate main still image data for a main still image having an aspect ratio of 4:3, but the present invention is not restricted to this arrangement, and an arrangement may be made wherein one image data for still image shooting is subjected to trimming processing (or cropping processing) to generate main still image data for a main still image having an aspect ratio of 4:3, in accordance with a still image size preset for the still image. In the same way, an arrangement may be made wherein multiple image data for moving image shooting are subjected to trimming processing (or cropping processing) to generate main moving image data for a main moving image, formed of multiple temporally continuous unit images having an aspect ratio of 16:9, in accordance with a moving image size preset for the moving image.

2-12. Thirteenth Embodiment

Further, while a description has been made above with the first embodiment regarding an arrangement wherein superimposition enhancement processing is performed on the composite thumbnail 40 regardless of the degree of difference in the pictures of the still image thumbnail 40A and unit image thumbnail 40B, the present invention is not restricted to this arrangement, and an arrangement may be made regarding the composite thumbnail 40, wherein, as with the case of the main composite image 45, whether or not to execute superimposition enhancement processing at the time of generating the composite thumbnail 40 is selected and set by the user beforehand, or whether or not to automatically determined whether or not to execute the superimposition enhancement processing is set, with superimposition enhancement processing being performed as appropriate regarding the composite thumbnail 40 following the settings.

Also, with regard t the types of superimposition enhancement processing to perform on the composite thumbnail 40, the user may arbitrarily select one superimposition enhancement processing from multiple types of superimposition enhancement processing, as with the case of the main composite image.

2-13. Fourteenth Embodiment

Further, while a description has been made above with the first embodiment regarding an arrangement wherein the display control program according to an embodiment of the present invention is applied to a display control program stored in ROM 12 of the digital still camera 1 beforehand, with the CPU 10 of the digital still camera 1 executing the composite thumbnail display processing procedures RT1 shown in FIG. 17 and the continuous playback processing procedures RT2 shown in FIG. 18 following the display control program stored in the ROM 12, the present invention is not restricted to this arrangement, and an arrangement may be made wherein the display control program is installed into the digital still camera 1 by way of a computer-readable recording medium in which the display control program is installed, with the CPU 10 of the digital still camera 1 executing the composite thumbnail display processing procedures RT1 and the continuous playback processing procedures RT2 following the installed display control program.

The digital still camera 1 may also install the display control program from external sources, using cable or wireless communication media such as a Local Area Network, the Internet, a digital satellite broadcast, and so forth, or a computer device.

Also, computer-readable recording media for installing the display control program in the digital still camera 1 so as to be executable may include packaged media such as a flexible disk, for example.

Also, computer-readable recording media for installing the display control program in the digital still camera 1 so as to be executable may include packaged media such as a CD-ROM (Compact Disc-Read Only Memory), for example.

Also, computer-readable recording media for installing the display control program in the digital still camera 1 so as to be executable may include packaged media such as a DVD (Digital Versatile Disc), for example.

Also, computer-readable recording media for installing the display control program in the digital still camera 1 so as to be executable is not restricted to packaged media and may be realized by semiconductor memory or a magnetic disk or the like where the various types of programs can be temporarily or permanently recorded.

Also, the display control program may be provided to be recorded in the computer-readable recording media using cable or wireless communication media such as a Local Area Network, the Internet, a digital satellite broadcast, and so forth. Further, the display control program may be provided to be recorded in the computer-readable recording media using various types of communication interfaces, such as routers and modems and the like.

2-14. Fifteenth Embodiment

Further, while a description has been made above wherein the display control device is applied to the digital still camera 1 described with reference to FIGS. 1 through 25, the present invention is not restricted to this arrangement, and can be broadly applied to display control devices of various configurations which are capable of recording main still image data of main still images and main moving image data of main moving images with different aspect ratios, or externally acquiring and playing the same, such as personal computers, cellular phones, PDAs (Personal Digital Assistants), and like information processing device, hard disk recorders and like recording/playback devices, and so forth.

2-15. Sixteenth Embodiment

Further, while a description has been made above wherein the CPU 10 described above with reference to FIGS. 1 through 25 is applied as a composite image generating unit for generating a composite image by compositing a unit image and a still image, such that a still image which is correlated with a moving image and has a still image aspect ratio different from a moving image aspect ratio, is superimposed on a portion of a unit image of the moving image which is formed of multiple temporally continuous unit images having a moving image aspect ratio, the present invention is not restricted to this arrangement, and a broad range of other composite image generating units may be applied, such as a microprocessor and V-RAM (Video-Random Access Memory), or a composite image generating circuit of a hardware circuit configuration for generating a composite image by compositing a unit image and a still image, such that a still image which is correlated with a moving image and has a still image aspect ratio different from a moving image aspect ratio, is superimposed on a portion of a unit image of the moving image which is formed of multiple temporally continuous unit images having a moving image aspect ratio.

2-16. Seventeenth Embodiment

Further, while a description has been made above wherein the CPU 10 described above with reference to FIGS. 1 through 25 is applied as a display control unit for displaying a composite image on the display screen of the display unit, the present invention is not restricted to this arrangement, and a broad range of other display control units may be applied, such as a microprocessor, or a display control circuit of a hardware circuit configuration for displaying a composite image on the display screen of the display unit.

2-17. Eighteenth Embodiment

Further, while a description has been made above wherein the CPU 10 described above with reference to FIGS. 1 through 25 is applied as a superimposition enhancement processing unit for applying superimposition enhancement processing, wherein superimposition of a still image onto a head unit image is emphasized, to the boundary portion between the head unit image and still image of a composite image, the present invention is not restricted to this arrangement, and a broad range of other superimposition enhancement processing units may be applied, such as a microprocessor, or a superimposition enhancement processing circuit of a hardware circuit configuration for applying superimposition enhancement processing, wherein superimposition of a still image onto a head unit image is emphasized, to the boundary portion between the head unit image and still image of a composite image (e.g., superimposing an image reminiscent of the frame of a photograph, the frame of a television monitor, and so forth).

It should be understood by those skilled in the art that various modifications, combinations, sub-combinations and alterations may occur depending on design requirements and other factors insofar as they are within the scope of the appended claims or the equivalents thereof.

What is claimed is:

1. A display control device comprising:
   a composite image generating unit configured to generate a composite image by compositing a unit image and a single still image, such that the single still image which is correlated with a moving image and has a still image aspect ratio different from a moving image aspect ratio, is superimposed on a portion of a unit image of the moving image which is formed of multiple temporally continuous unit images having a moving image aspect ratio such that only the single still image is superimposed over a center of the unit image of the moving image; and
   a display control unit configured to display said composite image on a display screen of a display unit.

2. The display control device according to claim 1, wherein, following displaying said composite image on said display screen of said display unit, said display control unit displays only said unit image which is a component of said composite image, and following displaying only said unit image, automatically displays said moving image instead of said unit image.

3. The display control device according to claim 1, wherein said composite image generating unit generates said composite image by compositing said still image and a head unit image temporally at the head of a plurality of said unit images making up said moving image as said unit image of said moving image.

4. A display control device comprising:
   a composite image generating unit configured to generate a composite image by compositing a unit image and a still image, such that a still image which is correlated with a moving image and has a still image aspect ratio different from a moving image aspect ratio, is superimposed on a portion of a unit image of the moving image which is formed of multiple temporally continuous unit images having a moving image aspect ratio, said composite image generating unit generates said composite image by compositing said still image and a head unit image temporally at the head of a plurality of said unit images making up said moving image as said unit image of said moving image, and said composite image generating unit generates said composite image by compositing said head unit image and said still image such that the right end portion and left end portion of said head unit image in the horizontal direction protrude from the right end and left end of said still image in the horizontal direction; and
   a display control unit configured to display said composite image on a display screen of a display unit.

5. The display control device according to claim 4, further comprising:
   a superimposition enhancement processing unit configured to perform superimposition enhancement processing for emphasizing superimposition of said still image onto said head unit image, at the boundary portions between said head unit image and said still image in said composite image.

6. The display control device according to claim 5, wherein said composite image generating unit performs at least one of:

generating said composite image by compositing a main unit image of a moving image size for recording of said moving image, as said head unit image of said moving image, and a main still image of a still image size for recording said still image as said still image; and generating said composite image by compositing a unit image thumbnail obtained by thing out pixels from said main unit image of said moving image size as said head unit image of said moving image, and a still image thumbnail obtained by thing out pixels from said still image of a still image size as said still image.

7. A display control method comprising:

generating a composite image by compositing a unit image and a single still image, such that the single still image which is correlated with a moving image and has a still image aspect ratio different from a moving image aspect ratio, is superimposed on a portion of a unit image of the moving image which is formed of multiple temporally continuous unit images having a moving image aspect ratio such that only the single still image is superimposed over a center of the unit image of the moving image; and displaying said composite image.

8. A non-transitory computer readable medium encoded with a display control program including a set of instructions which, when executed by a computer, cause the computer to execute a method comprising:

generating a composite image by compositing a unit image and a single still image, such that the single still image which is correlated with a moving image and has a still image aspect ratio different from a moving image aspect ratio, is superimposed on a portion of a unit image of the moving image which is formed of multiple temporally continuous unit images having a moving image aspect ratio such that only the single still image is superimposed over a center of the unit image of the moving image; and displaying said composite image.

* * * * *